United States Patent
Kalgutkar et al.

(10) Patent No.: US 10,640,614 B2
(45) Date of Patent: *May 5, 2020

(54) SEGMENTED SILICONE POLYAMIDE BLOCK COPOLYMERS AND ARTICLES CONTAINING THE SAME

(71) Applicant: 3M INNOVATIVE PROPERTIES COMPANY, St. Paul, MN (US)

(72) Inventors: Rajeep S. Kalgutkar, Woodbury, MN (US); Ramesh C. Kumar, Woodbury, MN (US); David S. Hays, Woodbury, MN (US); Joseph A. Severance, St. Paul, MN (US); Timothy M. Hackbarth, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/316,795

(22) PCT Filed: Jul. 20, 2017

(86) PCT No.: PCT/US2017/043045
§ 371 (c)(1),
(2) Date: Jan. 10, 2019

(87) PCT Pub. No.: WO2018/022417
PCT Pub. Date: Feb. 1, 2018

(65) Prior Publication Data
US 2019/0292325 A1    Sep. 26, 2019

Related U.S. Application Data

(60) Provisional application No. 62/367,901, filed on Jul. 28, 2016.

(51) Int. Cl.
*C08G 77/455* (2006.01)
*C09J 7/40* (2018.01)
(Continued)

(52) U.S. Cl.
CPC ......... *C08G 77/455* (2013.01); *C08G 18/603* (2013.01); *C08G 18/61* (2013.01);
(Continued)

(58) Field of Classification Search
CPC ....... C08G 77/455; C08G 18/603; C09J 7/401
See application file for complete search history.

(56) References Cited

U.S. PATENT DOCUMENTS 3,159,601 A   12/1964   Ashby
3,274,155 A   9/1966   Saunders
(Continued)

FOREIGN PATENT DOCUMENTS

CN   102432976   6/2013
CN   103031051   10/2013
(Continued)

OTHER PUBLICATIONS

Breuer, "Dimer Acids", Kirk-Othmer Encyclopedia of Chemical Technology, published by John-Wiley and Sons, 2000, pp. 1-13.
(Continued)

*Primary Examiner* — Victor S Chang
(74) *Attorney, Agent, or Firm* — Eric E. Silverman

(57) ABSTRACT

Segmented silicone polyamide block copolymers that comprise dimer acid residues and articles containing the same.

15 Claims, 2 Drawing Sheets

(51) Int. Cl.

| | | |
|---|---|---|
| C09D 183/10 | (2006.01) | |
| C08G 69/42 | (2006.01) | |
| C09J 175/04 | (2006.01) | |
| C08G 18/60 | (2006.01) | |
| C08L 83/10 | (2006.01) | |
| C08G 18/75 | (2006.01) | |
| C08G 18/61 | (2006.01) | |
| C08G 69/26 | (2006.01) | |

(52) U.S. Cl.
CPC .......... *C08G 18/755* (2013.01); *C08G 69/42* (2013.01); *C08L 83/10* (2013.01); *C09D 183/10* (2013.01); *C09J 7/401* (2018.01); *C09J 175/04* (2013.01); *C08G 69/265* (2013.01); *C08G 2170/40* (2013.01); *C09J 2453/005* (2013.01)

(56) References Cited

U.S. PATENT DOCUMENTS

| | | |
|---|---|---|
| 3,325,450 A | 6/1967 | Scotia |
| 3,553,282 A | 1/1971 | Holub |
| 3,647,728 A | 3/1972 | Deflorin |
| 4,011,279 A | 3/1977 | Berger |
| 4,225,702 A | 9/1980 | Makino |
| 4,728,542 A | 3/1988 | Nachtkamp |
| 4,743,470 A | 5/1988 | Nachtkamp |
| 4,767,826 A | 8/1988 | Liang |
| 4,925,735 A | 5/1990 | Koshizuka |
| 4,950,728 A | 8/1990 | Barthelemy |
| 5,057,377 A | 10/1991 | Karydas |
| 5,214,119 A | 5/1993 | Leir |
| 5,296,144 A | 3/1994 | Sternina |
| 5,298,276 A | 3/1994 | Jayaraman |
| 5,300,246 A | 4/1994 | Yamamoto |
| 5,331,018 A | 7/1994 | McGinniss |
| 5,643,986 A | 7/1997 | Ishikawa |
| 5,665,822 A | 9/1997 | Bitler |
| 5,677,376 A | 10/1997 | Groves |
| 5,945,185 A | 8/1999 | Hirai |
| 5,981,680 A | 11/1999 | Petroff |
| 6,051,216 A | 4/2000 | Barr |
| 6,153,691 A | 11/2000 | Gornowicz |
| 6,362,288 B1 | 3/2002 | Brewer |
| 6,441,118 B2 | 8/2002 | Sherman |
| 6,461,738 B2 | 10/2002 | Ishikawa |
| 6,468,639 B2 | 10/2002 | Ishikawa |
| 6,632,522 B1 | 10/2003 | Hyde |
| 6,649,704 B2 | 11/2003 | Brewer |
| 6,739,987 B2 | 5/2004 | Harris |
| 6,776,729 B2 | 8/2004 | Harris |
| 6,946,173 B2 | 9/2005 | Lim |
| 7,019,104 B1 | 3/2006 | Okada |
| 7,138,174 B2 | 11/2006 | Takeuchi |
| 7,202,321 B2 | 4/2007 | Byrd |
| 7,238,643 B2 | 7/2007 | Yukawa |
| 7,261,834 B2 | 8/2007 | Fuchs |
| 7,320,830 B2 | 1/2008 | Itou |
| 7,410,695 B2 | 8/2008 | Rabe |
| 7,419,708 B2 | 9/2008 | Kobayashi |
| 7,491,427 B2 | 2/2009 | Hayashi |
| 7,544,420 B2 | 6/2009 | Domine |
| 7,560,166 B2 | 7/2009 | Moore |
| 7,645,516 B2 | 1/2010 | Scheim |
| 7,705,103 B2 | 4/2010 | Sherman |
| 7,750,073 B2 | 7/2010 | Brahms |
| 7,765,015 B2 | 7/2010 | Johnson |
| 7,843,045 B2 | 11/2010 | Tateoka |
| 7,906,215 B2 | 3/2011 | Byrd |
| 7,910,683 B2 | 3/2011 | Byrd |
| 7,915,371 B2 | 3/2011 | Byrd |
| 7,985,797 B2 | 7/2011 | Kitagawa |
| 8,124,173 B2 | 2/2012 | Naiki |
| 8,182,463 B2 | 5/2012 | Chiu |
| 8,192,351 B2 | 6/2012 | Fishler |
| 8,372,257 B2 | 2/2013 | Fujii |
| 8,623,073 B2 | 1/2014 | Klocke |
| 8,742,053 B2 | 6/2014 | Lange |
| 8,765,881 B2 | 7/2014 | Hays |
| 8,956,732 B2 | 2/2015 | Takeuchi |
| 9,012,537 B2 | 4/2015 | Takasaki |
| 9,056,447 B2 | 6/2015 | O'Brien |
| 2003/0215628 A1 | 11/2003 | Ma |
| 2004/0106699 A1 | 3/2004 | Ishikawa |
| 2006/0047083 A1 | 3/2006 | Yilgor |
| 2007/0098664 A1 | 5/2007 | Mougin |
| 2008/0318057 A1 | 12/2008 | Sherman |
| 2008/0318058 A1 | 12/2008 | Sherman |
| 2009/0048480 A1 | 2/2009 | Klenk |
| 2009/0054577 A1 | 2/2009 | Uchida |
| 2009/0264980 A1 | 10/2009 | Mackay |
| 2010/0203328 A1 | 8/2010 | Hochstetter |
| 2012/0083734 A1 | 4/2012 | Ayres |
| 2012/0244332 A1 | 9/2012 | Takeuchi |
| 2014/0138025 A1 | 5/2014 | Bartusiak |
| 2014/0178317 A1 | 6/2014 | Gaudry |
| 2019/0225843 A1* | 7/2019 | Kalgutkar ................ B32B 7/06 |

FOREIGN PATENT DOCUMENTS

| | | |
|---|---|---|
| CN | 103779515 | 2/2015 |
| CN | 104804366 | 7/2015 |
| CN | 102732131 | 11/2015 |
| CN | 103910845 | 12/2015 |
| CN | 103897194 | 3/2016 |
| CN | 104804677 | 7/2016 |
| CN | 104327719 | 1/2017 |
| DE | 102007034991 | 1/2009 |
| EP | 193808 | 9/1986 |
| EP | 238991 | 9/1987 |
| EP | 250248 | 12/1987 |
| EP | 913518 | 5/1999 |
| EP | 925955 | 6/1999 |
| GB | 1138535 | 1/1969 |
| GB | 2147319 | 5/1985 |
| HU | 197369 | 3/1989 |
| JP | 60137691 | 7/1985 |
| JP | 60241448 | 11/1985 |
| JP | 4025565 | 1/1992 |
| JP | 08011440 | 1/1996 |
| JP | 08245942 | 9/1996 |
| JP | 09013001 | 1/1997 |
| JP | 3015430 | 3/2000 |
| JP | 2000327980 | 11/2000 |
| JP | 3184442 | 7/2001 |
| JP | 3281963 | 5/2002 |
| JP | 2002156758 | 5/2002 |
| JP | 2002161205 | 6/2002 |
| JP | 2003206466 | 7/2003 |
| JP | 2004051714 | 2/2004 |
| JP | 2004051910 | 2/2004 |
| JP | 2004217861 | 5/2004 |
| JP | 2004217862 | 5/2004 |
| JP | 2004333672 | 11/2004 |
| JP | 2004352817 | 12/2004 |
| JP | 2005055545 | 3/2005 |
| JP | 2005060417 | 3/2005 |
| JP | 3635883 | 4/2005 |
| JP | 3637934 | 4/2005 |
| JP | 2005162954 | 6/2005 |
| JP | 3721768 | 11/2005 |
| JP | 2005316131 | 11/2005 |
| JP | 2005325203 | 11/2005 |
| JP | 3737983 | 1/2006 |
| JP | 2006119513 | 5/2006 |
| JP | 2006169409 | 6/2006 |
| JP | 2006190717 | 7/2006 |
| JP | 2006342310 | 12/2006 |
| JP | 2007138000 | 6/2007 |
| JP | 3961670 | 8/2007 |
| JP | 4058873 | 3/2008 |
| JP | 4075580 | 4/2008 |
| JP | 4075581 | 4/2008 |

(56) References Cited

FOREIGN PATENT DOCUMENTS

| | | |
|---|---|---|
| JP | 4085650 | 5/2008 |
| JP | 4120110 | 7/2008 |
| JP | 2008201117 | 9/2008 |
| JP | 4174274 | 10/2008 |
| JP | 4218282 | 2/2009 |
| JP | 4232297 | 3/2009 |
| JP | 2009056771 | 3/2009 |
| JP | 2009079200 | 4/2009 |
| JP | 4341309 | 10/2009 |
| JP | 4474961 | 6/2010 |
| JP | 4507707 | 7/2010 |
| JP | 4517749 | 8/2010 |
| JP | 4555985 | 10/2010 |
| JP | 4622480 | 2/2011 |
| JP | 4658735 | 3/2011 |
| JP | 4711458 | 6/2011 |
| JP | 4735092 | 7/2011 |
| JP | 4834962 | 12/2011 |
| JP | 4962001 | 6/2012 |
| JP | 5000074 | 8/2012 |
| JP | 5018011 | 9/2012 |
| JP | 5103928 | 12/2012 |
| JP | 2013001786 | 1/2013 |
| JP | 2013002805 | 5/2013 |
| JP | 5251763 | 7/2013 |
| JP | 5272509 | 8/2013 |
| JP | 5282414 | 9/2013 |
| JP | 2013234257 | 11/2013 |
| JP | 5444825 | 3/2014 |
| JP | 5485103 | 5/2014 |
| JP | 5501672 | 5/2014 |
| JP | 2014088522 | 5/2014 |
| JP | 5551523 | 7/2014 |
| JP | 5555063 | 7/2014 |
| JP | 5573573 | 8/2014 |
| JP | 5659783 | 1/2015 |
| JP | 20141475139 | 1/2015 |
| JP | 101491589 | 2/2015 |
| WO | WO 1997-003748 | 2/1997 |
| WO | WO 1998-015601 | 4/1998 |
| WO | WO 1999-003907 | 1/1999 |
| WO | WO 2002-008335 | 1/2002 |
| WO | WO 2005-010107 | 2/2005 |
| WO | WO 2009-063025 | 5/2009 |
| WO | WO 2009-129206 | 10/2009 |
| WO | WO 2011-034722 | 3/2011 |
| WO | WO 2013-183558 | 12/2013 |
| WO | WO 2014-115637 | 7/2014 |
| WO | WO 2015-048109 | 4/2015 |
| WO | WO 2018-022680 | 2/2018 |

OTHER PUBLICATIONS

Encyclopedia of Polymer Science and Engineering, vol. 13, Wiley-Interscience Publishers (New York, 1988).
Encyclopedia of Polymer Science and Technology, vol. 1, Interscience Publishers (New York, 1964).
Polyamide resins (nonnylon types) by Elvira O. Camara Greiner, Thomas Kalin, Takashi Kumamoto, CEH Marketing Research Report, Aug. 2009.
International Search report for PCT International Application No. PCT/US2017/043045 dated Nov. 14, 2017, 5 pages.

* cited by examiner

SEGMENTED SILICONE POLYAMIDE BLOCK COPOLYMERS AND ARTICLES CONTAINING THE SAME

CROSS REFERENCE TO RELATED APPLICATIONS

This application is a national stage filing under 35 U.S.C. 371 of PCT/US2017/043045, filed Jul. 20, 2017, which claims the benefit of U.S. Provisional Application No. 62/367,901, filed Jul. 28, 2016, the disclosure of which is incorporated by reference in its/their entirety herein.

BACKGROUND

Adhesives, such as pressure sensitive adhesives, are known to be useful as components of articles, such as tapes. In use, many such articles require that the pressure sensitive adhesive be released from contact with another component of the article. Such release can be facilitated by the use of a release layer. In tapes, release layers are sometimes known as low adhesion backsizes. Other such articles require that the pressure sensitive adhesive be released from a removable component that covers the adhesive before application of the adhesive to an adherent. Such removable components are sometimes known as release liners.

Some materials that are useful as release layers are known in the art and are disclosed in, for example, US 2014/0138025. Silicone containing polyamides are disclosed, for example, in EP 925955, WO 2009/129206, and U.S. Pat. No. 7,915,371.

Dimer acids have been described, for example in "Dimer Acids," by Thomas Breuer, in Kirk-Othmer Encyclopedia of Chemical Technology, published by John-Wiley and Sons, and "Polyamide resins (nonnylon types)" by Elvira O. Camara Greiner, Thomas Kalin, Takashi Kumamoto, CEH Marketing Research Report, August 2009, SRI Consulting (Menlo Park, Calif.).

SUMMARY

A segmented polyamide silicone block copolymer can have the structure of Formula I from alkylene, arylene, and substituted arylene; each $R_4$ is independently selected from O and N—$R_6$; each $R_5$ independently selected from one or more silicone polymers or one or more polyethers, with the proviso that silicone polymers constitute no less than 60% by weight of all of the $R_5$ moieties; each $R_6$ is independently selected from H, alkyl, and aryl; each y is independently from 1 to 1000; each x is independently from 2 to 200; and n is independently from 2 to 1000. The letter "n" represents the number of linear segments and the letter "m" represents the number of branched segments. The sum of n and m is 2 to 1000, and m is no greater than (m+n)/10.

An article comprising a first major surface can have a release layer on the first major surface. The release layer can include a segmented polyamide silicone block copolymer of Formula I.

DETAILED DESCRIPTION

Figure 1:
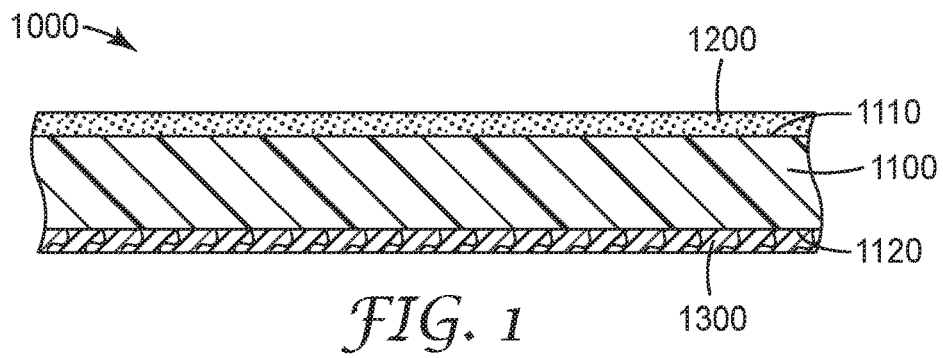
FIG. 1 is a profile view of an article as described herein.

Throughout this disclosure, singular forms such as "a," "an," and "the" are often used for convenience; however, it should be understood that the singular forms are meant to include the plural unless the singular alone is explicitly specified or is clearly indicated by the context.

"Independently," when used in reference to the identify of one or more variable elements, means that each occurrence of any of the variable elements may have the same or different identity, within the specified limitations, regardless of the identity of any other occurrence of the reference element. Thus, if there are two occurrences of element "E," and element E can be independently selected from identity Y or identity Z, each of the two occurrences of E can be either Y or Z in any combination (e.g., YY, YZ, ZY, or ZZ).

Formula I

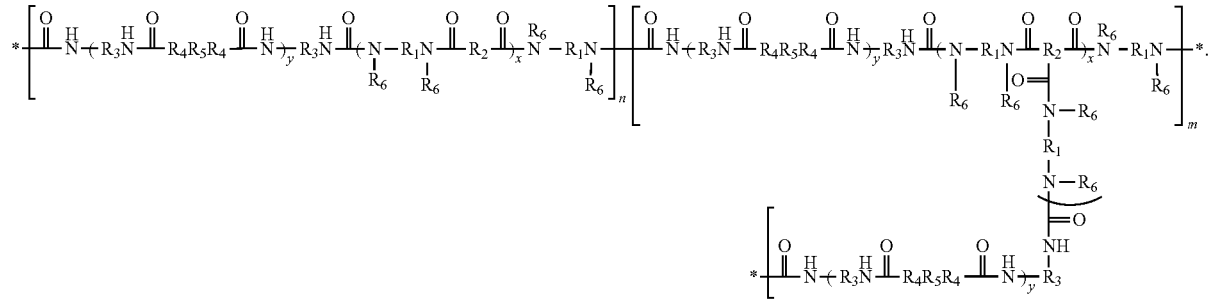

In Formula I, each * represents a point of attachment at the end of a repeat unit; each $R_1$ is independently selected from alkylene, alkenylene, arylene, substituted arylene, heteroarylene, or substituted heteroarylene; each $R_2$ is independently selected from dimer acid residue, alkene, alkylene, arylene, and heteroarylene, with the proviso that at least one $R_2$ is dimer acid residue; each $R_3$ is independently selected "Alkyl" refers to an aliphatic hydrocarbon radical. Many alkyl groups are from $C_1$ to $C_{30}$. Some alkyl groups can be $C_1$ or greater, such as $C_2$ or greater, $C_4$ or greater, $C_6$ or greater, or $C_8$ or greater. Some alkyl groups can be $C_{22}$ or smaller, $C_{16}$ or smaller, $C_{12}$ or smaller, $C_8$ or smaller, or $C_4$ or smaller. Unless otherwise indicated, any alkyl group can independently be linear, branched, cyclic, or a combination thereof (e.g., a cyclic alkyl can also have a linear or branched component.) Exemplary alkyl groups include methyl, ethyl, propyl, isopropyl, n-butyl, t-butyl, sec-butyl, iso-butyl, 2-ethyl hexyl, iso-octyl, n-octyl, dodecyl, hexadecyl, behenyl, and the like.

"Alkenyl" refers to a hydrocarbon radical having one or more ethylenically unsaturated group. Exemplary alkenyl radicals are from $C_2$ to $C_{30}$. Some alkenyl groups can be $C_1$ or greater, such as $C_2$ or greater, $C_4$ or greater, $C_6$ or greater, or $C_8$ or greater. Some alkenyl groups can be $C_{22}$ or smaller, $C_{16}$ or smaller, $C_{12}$ or smaller, $C_8$ or smaller, or $C_4$ or smaller. Unless otherwise indicated, any alkenyl group can independently be linear, branched, cyclic, or a combination thereof (e.g., a cyclic alkenyl can also have a linear or branched component.) Exemplary alkenyl groups include vinyl, allyl, and the like.

"Oxyalkyl" refers to a radical having the formula O-alkyl. The alkyl portion of the oxyalkyl can be any alkyl, such as those discussed above with reference to the definition of the term alkyl. Oxyalkyl can be written using standard prefixes to indicate the number of carbon atoms in the alkyl portion of the oxyalkyl. For example, oxymethyl is an oxyalkyl wherein the alkyl portion has one carbon, oxyethyl is an oxyalkyl wherein the alkyl portion has two carbons, etc. Oxyoctyl is an exemplary oxyalkyl that is often used in the compounds described herein.

"Alkylene" refers to an aliphatic hydrocarbon diradical. Many alkylene diradicals are from $C_1$ to $C_{30}$. Alkylene diradicals can be $C_1$ or greater, $C_2$ or greater, $C_3$ or greater, $C_4$ or greater, $C_6$ or greater, or $C_8$ or greater. Alkylene diradicals can be $C_{22}$ or smaller, $C_{16}$ or smaller, $C_{12}$ or smaller, $C_{10}$ or smaller, or $C_8$ or smaller. Unless otherwise indicated, any alkylene can be linear, branched or cyclic or a combination thereof (e.g., having both a cyclic component and a linear component.) Exemplary alkylene groups include methylene, ethylene, propyl, isopropylene, n-butylene, t-butylene, sec-butylene, iso-butylene, 2-ethylhexylene, iso-octylene, dodecylene, hexadecylene, behenylene, and the like.

"Isocyanate" refers to a molecule comprising at least one —NCO radical or the —NCO radical itself.

"Aryl" refers to a fully conjugated, cyclic, hydrocarbon mono radical. Examples of aryl radicals include phenyl, napthyl, and the like.

"Substituted aryl" refers to an aryl mono radical wherein one or more of the hydrogen atoms are substituted with a substituent. Typical substituents include alkyl, alkenyl, oxyalkyl, hydroxyl, and the like. Exemplary substituted aryl groups include toluyl, xylyl, and the like.

"Arylene" refers to a fully-conjugated cyclic, hydrocarbon di radical. Examples of arylene radicals include phenylene, napthylene, and the like. Each of the diradicals in a substituted aryl can be located on the conjugated ring or on the substituent.

"Heteroaryl" refers to a fully conjugated, cyclic radical or polyradical containing at least one atom other than carbon in a ring. Examples of heteroaryl radicals include furanyl, pyridinyl and the like.

"Substituted heteroaryl" refers to a heteroaryl radical wherein one or more of the hydrogen atoms are substituted with a substituent. Typical substituents include alkyl, alkenyl, oxyalkyl, hydroxyl, and the like.

"Heteroarylene" refers to a fully conjugated, cyclic diradical containing at least one atom other than carbon in a ring. Examples of heteroarylene radicals include furanylene, pyridinylene, and the like.

"Substituted heteroarylene" refers to a heteroaryl radical wherein one or more of the hydrogen atoms are substituted with a substituent. Each of the diradicals in a substituted aryl can be located on the conjugated ring or on the substituent.

"PDMS" is an acronym for poly(di-methyl siloxane).

"DMF" is an acronym for dimethyl formamide.

"NMP" is an acronym for N-methyl pyrrolidone.

"IPA" is an acronym for iso-propylalcohol (2-methyl ethanol).

"PET" is an acronym for polyethylene terephthalate.

"Dimer acid" refers to the condensation product of two or more molecules of ethylenically unsaturated fatty acid. The condensation is typically by way of a chemical reaction at high temperature. The chemical reaction, which is usually conducted at high temperature, most commonly involves a radical reaction or a cycloaddition reaction, for example, a Diels-Alder reaction, or both, although other chemical reactions may also be implicated. Dimer acids can have ill-defined chemical structures because the chemical reaction that produces the dimer acid often yields more than one chemical entity as a product. Dimer acids are therefore most commonly mixtures of a plurality of condensation products. Commercially available dimer acids are often distilled to varying levels of purity. The dimer acids discussed herein are, in most cases, predominantly di-acids having two carboxylic acid functional groups, and typically at least 90%, at least 95%, at least 96%, at least 98%, or even at least 99% of the molecules in a dimer acid sample are di-acids. The remaining molecules are typically tri-acids, although very small amounts of higher functionality acids, such as tetra-acids, may be present in some cases. In some cases dimer acids having less than 90% di-acid content, and correspondingly higher tri-acid content, can be used.

"Residue" refers to the remaining portion of a monomer after the monomer is incorporated into a polymer. For example, when a diacid having the chemical formula HOC(O)—R—C(O)OH, is incorporated into a polyamide, the acid protons are not present as part of the polyamide. The residue of the diacid in the polyamide is —OC(O)—R—C(O)O—.

"D" is used as an abbreviation for "Dalton," a known unit of molecular weight. "D" may be preceded by standard prefixes to indicate orders of magnitude, for example, "kD" for kiloDalton, etc.

"Number average molecular weight" or "$M_n$" equals $\Sigma M_i N_i / \Sigma N_i$, wherein $N_i$ is the number of moles of polymer chain "i" and $M_i$ is the molar mass of the polymer chain "i." Number average molecular weights as reported in this disclosure are those measured by gel permeation chromatography (GPC) against narrow polystyrene standards and detected with a refractive index detector.

"Weight average molecular weight" or "$M_w$" equals $\Sigma M_i N_i / M_i N_i$, wherein $N_i$ is the number of moles of polymer chain "i" and $M_i$ is the molar mass of the polymer chain "i." Weight average molecular weights as reported in this disclosure are those measured by gel permeation chromatography (GPC) against narrow polystyrene standards and detected with a refractive index detector.

Silicone coatings can be useful as release liners because, in many cases, silicones are non-adherent. Many silicones do not adhere to adhesives such as pressure sensitive adhesives. This lack of adhesiveness can pose a problem in forming coatings with some silicones because many silicones can fail to laminate to substrates or can delaminate easily after being applied to a substrate.

Polyamides can useful as polymer coatings because many polyamides adhere to a wide variety of substrates. Polyamides can also be very durable. However, polyamides typically do not provide release properties.

Polyamide and silicone polymers are highly incompatible. Table 1 shows the solubility of a short chain (5,000 Dalton number average molecular weight) amine-terminated PDMS ($PDMS-NH_2$) and a polyamide made according to Preparative Example 1. Prior to the work described in the present disclosure, this incompatibility made it difficult to conceive of, much less produce, materials that can contain both polyamides and silicones.

TABLE 1

| Polymer | | Solvent | | | | |
|---|---|---|---|---|---|---|
| Prep. Ex 1 | $PDMS-NH_2$ | DMF | NMP | Toluene | IPA | Soluble? |
| 0.5 g | | 4.5 g | | | | No |
| 0.5 g | | | 4.5 g | | | No |
| 0.5 g | | | | 3.6 g | 0.9 g | No |
| | 0.5 g | 4.5 g | | | | No |
| | 0.5 g | | 4.5 g | | | No |
| | 0.5 g | | | 3.6 g | 0.9 g | Yes |

Even if polyamide and silicone could have been combined, for example in a single material, it would still have been necessary to find a manner of combining so that the final material could, in at least most cases, maintain one or more of the desirable properties of both polyamide and silicones. Combinations of polyamide and silicone in a single material do not necessarily retain any of the desirable properties of either the polyamide or the silicone.

Applicants have found that silicone polymer and polyamide can be combined into a copolymer that is a segmented block copolymer. A segmented block copolymer does not have the same topography as a typical block copolymer. A typical block copolymer of monomers A and B has one or more blocks of polymerized monomer A ("A monomer blocks") and one or more blocks of polymerized monomer B ("B monomer blocks"). For example, an A-B diblock copolymer has the construction $A_x$-b-$B_y$, and thus contains block having all A monomers and a block of all B monomers. The area where the A monomer block meets the B monomer block typically contains a mixture of A and B monomers.

It can be useful to think of a segmented block copolymer as a block copolymer of block copolymers. Thus, a segmented block copolymer of A and B can have the construction $(A_x$-b-$B_y)_n$. In this construction, each of the segments of the segmented block copolymer contains both an A monomer block and a B monomer block. Also in this construction, every A monomer block is adjacent to a B monomer block and separated from the other A monomer blocks.

In the silicone polymer and polyamide segmented block copolymers discussed herein, each segment contains a polyamide block and a silicone polymer block. Applicants have found that this topography can result in a polymer that retains the release properties of the silicone as well as the coatability and durability of a polyamide.

The compatibility issues discussed above is addressed by the use of polyamide blocks that containing one or more dimer acid residues. In most cases, the dimer acid residues in the polyamide blocks are at least 50% by weight of all of the diacid residues in the polyamide blocks.

Thus, a segmented polyamide silicone block copolymer can be a polymer of Formula I.

Formula I

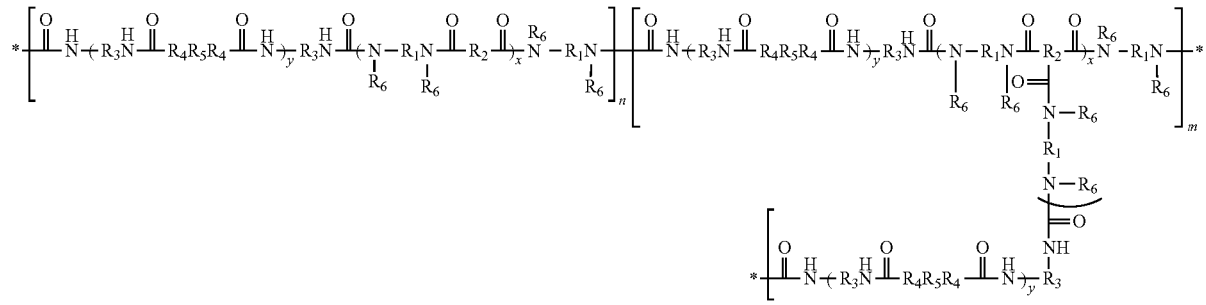

In Formula I, the asterisks (*) represent points of attachment for the segments, and indicate that the line terminus near them is not a methyl group.

$R_1$ is typically a residue of a diamine component of a polyamide block, and can be independently selected from alkylene, alkenylene, arylene, substituted arylene, heteroarylene, or substituted heteroarylene. Common alkylene groups are $C_1$ or greater, such as $C_2$ or greater, $C_4$ or greater, $C_6$ or greater, or $C_8$ or greater. Some alkyl groups can be $C_{22}$ or smaller, $C_{16}$ or smaller, $C_{12}$ or smaller, $C_8$ or smaller, or $C_4$ or smaller. Any alkylene group can independently be linear, branched, cyclic, or a combination thereof (e.g., a cyclic alkyl can also have a linear or branched component.) Exemplary alkylene groups include methylene, ethylene, propylene, isopropylene, n-butylene, t-butylene, sec-butylene, iso-butylene, 2-ethyl hexylene, iso-octylene, n-octylene, dodecylene, hexadecylene, behenylene, and the like. Common alkenylene groups are from $C_2$ to $C_{30}$. Some alkenylene groups can be $C_1$ or greater, such as $C_2$ or greater, $C_4$ or greater, $C_6$ or greater, or $C_8$ or greater. Some alkenylene groups can be $C_{22}$ or smaller, $C_{16}$ or smaller, $C_{12}$ or smaller, $C_8$ or smaller, or $C_4$ or smaller. Any alkenylene group can independently be linear, branched, cyclic, or a combination thereof (e.g., a cyclic alkenyl can also have a linear or branched component.) Common arylene groups include phenylene and napthylene and the like. Common substituted arylene groups include bensylene, methyl phenylene, toluylene, and the like. Common heteroarylenes include furan diradical, pyrrolidene diradical, and piperdine diradical. Common substituted arylenes include furane diradical substituted with alkyl, pyrrolidine diradical substituted with alkyl, particularly N-alkyl substituted, and piperidine diradical substituted with alkyl. Particular examples of $R_1$ include ethylene, n-propylene, isopropylene, n-butylene, sec-butylene, iso-butylene, and the like. Ethylene is most common.

$R_2$ is typically a residue of the di-acid diamine component of a polyamide block, and can be independently selected from dimer acid residue, alkene, alkylene, arylene, and heteroarylene, with the proviso that at least one $R_2$ is dimer acid residue. More typically, dimer acid residue is at least 50% by weight of $R_2$ based on the total weight of all $R_2$ groups, such as at least 55%, at least 60%, at least 65%, at least 70%, at least 75%, at least 80%, at least 85%, at least 90% or even at least 95%, by weight of $R_2$ based on the total weight of all $R_2$ groups. Suitable dimer acids are commercially available, for example, under the trade designation Pripol 1013 and Pripol 1009 (Croda, Inc. East Yorkshire, UK). In some cases, all of the $R_2$ groups are dimer acid.

In the cases when some of the $R_2$ groups are not dimer acid, suitable alkene groups for use as $R_2$ include those that are $C_1$ or greater, such as $C_2$ or greater, $C_4$ or greater, $C_6$ or greater, or $C_8$ or greater. Some alkylene groups can be $C_{22}$ or smaller, $C_{16}$ or smaller, $C_{12}$ or smaller, $C_8$ or smaller, or $C_4$ or smaller. Many alkylenes are $C_1$ to $C_{22}$. Any alkylene group can independently be linear, branched, cyclic, or a combination thereof (e.g., a cyclic alkyl can also have a linear or branched component.) Exemplary alkylene groups include methylene, ethylene, propylene, isopropylene, n-butylene, t-butylene, sec-butylene, iso-butylene, 2-ethyl hexylene, iso-octylene, n-octylene, dodecylene, hexadecylene, behenylene, and the like. Some alkenylene groups can be $C_{22}$ or smaller, $C_{16}$ or smaller, $C_{12}$ or smaller, $C_8$ or smaller, or $C_4$ or smaller. Any alkenylene group can independently be linear, branched, cyclic, or a combination thereof (e.g., a cyclic alkenyl can also have a linear or branched component.) Common arylene groups include phenylene and napthylene and the like. Common substituted arylene groups include bensylene, methyl phenylene, toluylene, and the like. Common heteroarylenes include furane diradical, pyrrolidene diradical, and piperdine diradical. Common substituted arylenes include furan diradical substituted with alkyl, pyrrolidine diradical substituted with alkyl, particularly N-alkyl substituted, and piperidine diradical substituted with alkyl.

$R_3$ is typically a residue of a diisocyanate end cap, and can be independently selected from alkylene, arylene, substituted arylene, heteroarylene and substituted heteroarylene. When alkylene, any suitable alkylene can be used. Typical alkylene groups include those that are $C_1$ or greater, such as $C_2$ or greater, $C_4$ or greater, $C_6$ or greater, or $C_8$ or greater. Some alkylene groups can be $C_{22}$ or smaller, $C_{16}$ or smaller, $C_{12}$ or smaller, $C_8$ or smaller, or $C_4$ or smaller. Any alkylene group can independently be linear, branched, cyclic, or a combination thereof (e.g., a cyclic alkyl can also have a linear or branched component.) Exemplary alkylene groups include methylene, ethylene, propylene, isopropylene, n-butylene, t-butylene, sec-butylene, iso-butylene, 2-ethyl hexylene, iso-octylene, n-octylene, dodecylene, hexadecylene, behenylene, and the like. When $R_3$ is arylene, phenylene is most common. When $R_3$ is substituted arylene, alkyl substitutes are most common. Typical alkyl substitutes include those that are $C_1$ or greater, such as $C_2$ or greater, or $C_4$ or greater. Alkyl substitutes can be $C_8$ or smaller, or $C_4$ or smaller.

$R_6$ typically comes from a nitrogen bound radical in the diamine residue of a polyamide block, and can be independently selected from H and alkyl. Most commonly, at least one $R_6$ is H. In some cases, all $R_6$ are H. When $R_6$ is alkyl, $C_1$ to $C_{12}$ alkyl, such as methyl, ethyl, propyl, or butyl, are most common. When $R_6$ is aryl, phenyl is most common. While each $R_6$ is shown in Formula I as a distinct moiety, it is possible that two $R_6$ moieties can be chemically bonded to one another to form, in combination with an intervening moiety, a ring or heteroaryl. The heteroaryl can be a diamine, such as piperazine.

Each $R_5$ is independently selected from one or more silicone polymers or one or more polyethers, with the proviso that one or more silicone polymers constitute no less than 60% by weight of all of the $R_5$ moieties. In some cases, the one or more silicone polymers constitute no less than 65%, no less than 70%, no less than 80%, no less than 85%, no less than 90%, no less than 95%, or even 100% by weight of all the $R_5$ moieties. The silicone polymers are typically one or more siloxanes, such as poly(diorgano siloxanes). The organic radicals in the poly(diorgano siloxanes) can be any suitable organic radicals, but are typically alkyl, aryl, or substituted aryl, and most commonly alkyl or aryl. When alkyl, the organic groups are usually $C_1$ to $C_{22}$. When aryl, the organic groups are usually phenyl. Other organic groups, such as alkenyl, for example allyl, and oxyalkyl, are possible. Most commonly, the poly(diorgano siloxane) is PDMS. For example, $R_5$ can be a poly(diorgano siloxane), such as a PDMS, having a number average molecular weight no less than 1 kD, no less than 2.5 kD, no less than 5 kD, no less than 7.5 kD, no less than 10 kD, no less than 12.5 kD, no less than 15 kD, no less than 20 kD, no less than 25 kD, no less than 30 kD, no less than 40 kD, no less than 50 kD, no less than 75 kD, no less than 100 kD, or even no less than 125 kD. $R_5$ can also be a poly(diorgano siloxane), such as a PDMS, having a number average molecular weight no greater than 250 kD, no greater than 100 kD, no greater than 75 kD, no greater than 60 kD, no greater than 50 kD, no greater than 40 kD, no greater than 30 kD, no greater than 25 kD, no greater than 20 kD, no greater than 15 kD, no greater than 12.5 kD, no greater than 10 kD, or even no greater than 7.5 kD. Each $R_5$ can, in some cases, further comprise one or more polyethers. The polyether is not required; in many cases, each $R_5$ is silicone polymer. Typical polyethers are polyalkylene glycol polymers or copolymers, such as polyethylene oxide, polypropylene oxide, or copolymers of polyethylene oxide and polypropylene oxide. Suitable polyethers having amine terminal groups are commercially available, such as under the trade designation Jeffamine, and in particular Jeffamine ED-900, from Huntsman Corporation (Salt Lake City, Utah, USA).

$R_4$ is typically a residue of an end-group for the silicone polymers, and can be independently selected from O and N—$R_6$, wherein $R_6$ is defined as above.

Each x independently represents the degree of polymerization of a polyamide block. The value of x is typically 2-200, such as 2-100, 2-50, or 10-30.

Each y independently represents the degree of chain extension of a poly(diorgano siloxane) block. The value of y is typically 1-1050.

The sum m+n represents the number of segments in the segmented block copolymer. Each n independently represents the number of linear segments Formula I. Each m independently represents the number of branched segments. Branched segments, if present, are typically due to a small portion of the dimer acid being tri-acid molecules. Typically, the branched segments represent small amounts of the segmented block copolymer, such that m is no more than (m+n)/10. In some cases, m is no more than (m+n)/20, no more than (m+n)/30, no more than (m+n)/50, or no more than (n+m)/100. In many cases, the amount of trimer in the dimer acid is so low that the segmented block copolymer is essentially linear. Regardless of the relative values of m+n, the sum of m+n can be, for example, 10 or greater 25 or greater, 50 or greater, 100 or greater, 200 or greater, 300 or greater, 400 or greater, 500 or greater, 600 or greater, 700 or greater, or even 800 or greater. In some cases, sum of m+n is 1,000 or less, 900 or less, 800 or less, 700 or less, 600 or less, 500 or less, 300 or less, 200 or less, or even 100 or less. In many cases, sum of m+n is 10-200.

The polymer of Formula I can be prepared in steps. In one step, an amine-terminated polyamide of Formula II is prepared. In Formula II, each of $R_1$, $R_2$, and $R_6$ have the same definition as discussed above with respect to Formula I.

Formula II

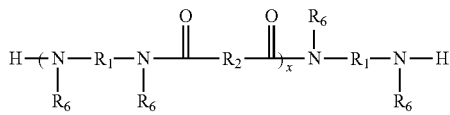

The amine terminated polyamide of Formula II can be prepared by any suitable method for preparing amine-terminated polyamides. For example, a diamine can be admixed with a diacid or a synthetic equivalent thereof. Typical synthetic equivalents include diester, such as a dimethyl ester, and diacid halide, typically a diacid chloride. When a dimer acid is used for the diacid, one or both of the carboxylic functional groups can be first converted to a synthetic equivalent. Suitable synthetic equivalents include acid halide, most commonly acid chloride, or ester, most commonly methyl ester. Conversion to acid chloride can be accomplished by any suitable method, such as by reaction with thionyl chloride. Conversion to methyl ester can be accomplished by any suitable method, such as by reaction with methanol. Most commonly, the dimer acid is used as-is without conversion of the carboxylic acid groups to synthetic equivalents.

The reaction between the diacid or synthetic equivalent thereof and diamine can be conducted the presence of an organic liquid, which can be a solvent for the diacid or synthetic equivalent thereof, diamine, or both. When an organic liquid is used, it typically does not include molecules that have a functional group that chemically reacts with the acid or amine functional groups under the reaction conditions. Suitable organic liquids can include tetrahydrofuran, dichloromethane, chloroform, n-methyl pyrrolidone, dimethyl sulfoxide, toluene, xylenes, and the like. Mixtures of more than one liquid can also be used. Most commonly, the reaction is conducted neat without any added liquid. The reaction is typically heated, especially when the diacid is in the form of a di carboxylic acid or a diester, such as a methyl ester. Any temperature sufficient to promote the reaction at a suitable rate can be used, but the temperature is often higher than the boiling point of the water or alcohol that is produced in the case of a dicarboxylic acid or diester, respectively. The reaction is often performed in a vessel fitted with a distillation head or Dean-Stark trap to facilitate constant removal of the water or alcohol from the reaction vessel. Heat is often not needed when the diacid is in the form of a diacid halide, such as a diacid chloride. When heat is used, typical temperatures are from 80° C. to 280° C., depending on the specific diamine and diacid that are selected. Other temperatures can also be used in some cases. While the reaction can be conducted under atmospheric conditions, it is often conducted under an atmosphere of inert gas, such as nitrogen or argon, in order to minimize unwanted side reactions. The degree of conversion can also be increased by applying vacuum to the reaction mixture for all or part of the duration of the reaction. Typically, when a vacuum is applied, the pressure can be 13 Pa to 13,332 Pa. In many cases, the pressure is reduced for only part of the reaction time, in which cases the pressure is typically reduced towards the end of the reaction. In some cases, the pressure is reduced to about 4,000 Pa for the last two hours of the reaction time. While it is most common to use one diamine and one diacid to make the amine terminated polyamide of Formula II, it is also possible to use more than one diamine and more than one diacid. Regardless of how many different diamines and diacids are used, the relative amount of diamine and diacid is typically chosen such that the quotient of number of moles of diamine and the number of moles of diacid is 0.7-1.3, such as 0.8-1.2, 0.9-1.1, or even 1.

Once the reaction has reached a suitable degree of conversion, for example, when sufficient starting materials are consumed or when the polymer number or weight average molecular weight is sufficiently high, the reaction can be quenched. In order to assure that the polymer is fully amine terminated, quenching can be effected by adding a large amount of excess diamine to the reaction vessel.

When the dimer acid used to make the amine-terminated polyamide of Formula II has some tri-acid content, then a branched amine-terminated polyamide will typically be formed in addition to the linear amine-terminated polyamide of Formula II. Typically, the branched and linear amine-terminated polyamides are not separated; rather, the mixture of branched and linear amine-terminated polyamides are used together to make the segmented block copolymer of Formula I.

In another step, an isocyanate terminated silicone polymer of Formula III can be prepared separately from the amine-terminated polyamide of Formula II. The polymer of Formula III can be prepared by any known method of preparing isocyanate terminated silicones. In a typical preparation, an amine terminated poly(organosiloxane), such as an amine terminated PDMS, optionally together with an amine-terminated polyether, undergoes a chemical reaction with a diisocyanate. Any suitable diisocyanate can be used. Typical diisocyanates are alkylene diisocyanates, however substituted alkylene diisocyantes, arylene diisocyanates, substituted arylene diisocyantes, and other diisocyanates can also be employed. The diisocyanate typically does not have any chemically reactive groups that will interfere with the reaction between the amine. Cycloalkylene diisocyanates, such as dicycloexylmethane-4,4' diisocyanate, are common. Exemplary diisocyanates are obtainable under the trade designation DESMODUR, such as DESMODUR W from Covestro (Covestro Leverkusen, Germany). When an amine terminated poly(organosiloxane) is used, $R_4$ is N—$R_6$.

In another preparation, a hydroxy-terminated poly(organosilixane), such as a hydroxy-terminated PDMS, optionally together with a hydroxy-terminated polyether, can undergo a chemical reaction with a diisocyanates, such as the diisocyanates discussed above. When a hydroxy-terminated poly(organosilixane) is used $R_4$ is O.

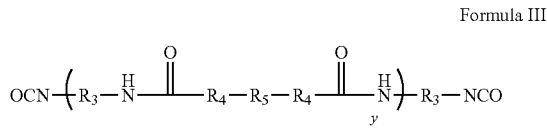

Formula III

The chemical reaction that end-caps the poly(diorgano siloxane) with isocyanate groups also can chain-extend the poly(diorgano siloxane), because two or more poly(diorgano siloxane) polymers can covalently bond at their endgroups by way of a reaction between an isocyanate terminated poly(diorgano siloxane) and a poly(diorgano siloxane) having a hydroxy or amine terminal group. The variable y in Formulas I and III represents the degree of chain extension of the poly(diorgano siloxane), and is typically from 1-1000.

The end capping and chain extending reaction can occur under any conditions suitable for the formation of polyureas or polyurethanes. Typically, the reaction will take place in the presence of an organic liquid, which can be a solvent or dispersant for the poly(diorgano siloxane), such as PDMS. Organic liquids that can be used for this purpose include those that do not contain any functional groups that interfere with the end-capping and chain-extending reaction. Suitable organic liquids can include, for example, benzene, toluene, chloroform, dichloromethane, tetrahydrofuran, and the like. The reaction between the amine or hydroxy terminated poly(diorgano siloxane) and the diisocyanate is often exothermic. In such cases, the reaction can occur at decreased temperatures. Suitable temperatures can be from −15° C. to 15° C., although other temperatures may also be used. The reaction can also be conducted at room temperature in some cases. While the reaction can be conducted under atmospheric conditions, it is more often conducted under an atmosphere of inert gas, such as nitrogen or argon, which can be useful in minimizing unwanted side reactions.

A segmented block copolymer of Formula I can be formed by the reaction of the amine terminated polyamide of Formula II (including any branched product that may have been formed with the amine-terminated polyamide of Formula II) and the chain-extended isocyanate end-capped poly(organo siloxane) of Formula III. The reaction can be conducted under any suitable conditions for reacting an amine with an isocyanate. For example, the reaction is often conducted at room temperature, but may be conducted lower temperatures, particularly in cases where the reaction is exothermic. When a low temperature is used, the temperature is often from −15° C. to 15° C., although other temperatures can also be used. The reaction can continue for as long as necessary to reach completion. It is possible to determine whether the reaction is complete by taking an aliquot of the reaction mixture and analyzing the aliquot by FT-IR for the presence of isocyanate groups. The reaction can be deemed complete when no isocyanate groups are detectable in the reaction mixture by FT-IR. The reaction between the polyamide of Formula II and the chain-extended isocyanate end-capped poly(organo siloxane) or Formula III often takes place in the presence of an organic liquid. Any suitable organic liquid can be used. Suitable organic liquids often include, for example, benzene, toluene, chloroform, dichloromethane, tetrahydrofuran, or the like, most commonly in combination one or more sterically hindered short-chain alcohols such as isopropanol, sec-butanol, or tert-butanol. The lower alcohol can be selected to help solubilize the polyamides, without significantly interfering with the chemical reaction.

In some cases, the diisocyanate end-capping reaction to form the diisocyanate end-capped poly(organo siloxane) of Formula III and the reaction of the poly(amide) of Formula II with the diisocyanate end-capped poly(organo siloxane) of Formula III can be carried out in the same operation. For example, after the end-capping and chain extension reaction that forms the diisocyanate end-capped poly(organo siloxane) of Formula III is complete, the poly(amide) of Formula II can be added to the reaction vessel, whereupon the reaction to form the segmented block copolymer of Formula I can occur.

The segmented block copolymer of Formula I has a variety of uses. For example, the segmented block copolymer of Formula I can be used as a coating on an article. In many cases, the segmented block copolymer of Formula I can be a release coating.

The article can comprise a substrate having a first major surface and optionally a second major surface. Any suitable substrate can be used. Many substrates are moldable thermoplastics. Most substrates are not foamed and are not porous.

Cellulosic substrates are useful for many applications, and are commonly used for tapes. Common cellulosic substrates include cellulose, paper, regenerated cellulose, wood fibers, and wood flour.

In many cases, the substrate is extrudable. Exemplary extrudable materials include homopolymers, copolymers, and blends of polymers. A variety of additives, such as additives that facilitate extrusion, pigments, dyes, and the like, can be added. Suitable polymers include, but are not limited to, polyolefins such as polypropylene or polyethylene; polystyrene, polycarbonate, polymethyl methacrylate, ethylene vinyl acetate copolymers, acrylate-modified ethylene vinyl acetate polymers, ethylene acrylic acid copolymers, nylon, polyvinylchloride, polyimide, and engineering polymers such as polyketones or polymethylpentanes. Mixtures of such polymers may also be used. In many cases, the substrate does not contain any vinyl-chloride-based polymers.

The substrate can contain a polyolefinic material, which is typically made up of at least 80 wt. % polyolefinic material, including any homopolymers, copolymers, blends, etc. thereof (not including the weight of any additives, if such are present). The substrate often comprises at least 90 wt. %, at least 95 wt. %, or at least 98 wt. %, polyolefinic material. In some cases, the substrate consists essentially of polyolefinic material, noting that this does not preclude the presence of additives such as extrusion aids, plasticizers, antioxidants, colorants, pigments, and the like, which can contain some small level of non-polyolefinic material.

Among other things, the polyolefinic material can be a polyethylenic material, meaning that the polyolefinic material contains at least 80 wt. % of polyethylene polymers (not including the weight of any additives, if present). The polyolefinic material can contain at least 90 wt. %, at least 95 wt. %, or at least 98 wt. % of polyethylene polymers, which are polymers that contain of at least 95 wt. % ethylene units. In many cases, the polyethylene polymers are polyethylene homopolymers. The substrate can consist essentially of polyethylene homopolymers, which does not preclude the presence of additives, such as those discussed above, which may contain some small level of non-polyethylene polymers.

Suitable polyethylene homopolymers include, for example, high-density polyethylene, medium-density polyethylene, low-density polyethylene, linear low-density polyethylene, ultra-low-density polyethylene, and the like. For some applications, polyethylene homopolymers consist essentially of a blend of low density polyethylene (LDPE, i.e. having a density of less than 0.93 g/cc) and high density polyethylene (HDPE, i.e. having a density of at least 0.94 g/cc). For some applications, the LDPE has a density of 0.92 g/cc or less. For some applications, the HDPE has a density of 0.96 or greater.

The LDPE and HDPE can be present at any suitable weight ratio. For example, the LDPE and HDPE may be present at a weight ratio of from about 10:90 LDPE:HDPE to about 90:10 LDPE:HDPE. In some cases, the weight ratio of LDPE to HDPE may be at most about 45:55, at most about 40:60, at most about 35:75, or at most about 30:70. In other cases embodiments, the weight ratio of LDPE to HDPE may be at least about 15:85, at least about 20:80, or at least about 25:75.

For some applications, the substrate comprises polyethylene terephthalate. Such substrates can contain at least 75 wt. %, 80 wt. %, 85 wt. %, 90 wt. %, or 95 wt. % of polyethylene terephthalate based on the total weight of the substrate (not including any primer layers which may be present).

For some applications, the substrate comprises polyimide. Such substrates can contain at least 75 wt. %, 80 wt. %, 85 wt. %, 90 wt. %, or 95 wt. % of polyimide based on the total weight of the substrate (not including any primer layers which may be present).

Suitable substrates can include one or more inorganic fillers, such as one or more of calcium carbonate, kaolin, talc, silica, titanium dioxide, glass fibers, glass bubbles, and the like. Such fillers can be present in any suitable amounts, typically from 0.05 wt. % to 20 wt. % based on the total weight of the substrate.

Depending on the application, one or more other additives, such as antioxidants, extrusion aids, plasticizers, pigments, and dyes, can also be included. Useful additives are known to the person of ordinary skill in the art, and disclosed in, for example, US 2014/0138025 (Bartusiak) and U.S. Pat. No. 6,632,522 (Hyde).

The segmented block copolymer of Formula I can be a component of an article. For example, the segmented block copolymer of Formula I can be a coating on an article. While the segmented block copolymer of Formula I can be useful in many different coating applications, it can find particular utility as a component of a release layer.

The segmented block copolymer can be coated on an article by any suitable method. Suitable methods include solution coating methods, such as solvent casting, spin coating, knife coating, and drop coating. Other suitable methods include extruding a coating of the segmented block copolymer directly onto a substrate. Still other coating methods may be suitable.

In many cases, the article is an adhesive article, such as a tape. In such cases, the article typically has a first major surface upon which an adhesive, such as a pressure sensitive adhesive, is disposed and a second major surface upon which a release layer comprising the segmented block copolymer of Formula I is disposed.

The first major surface of the substrate, upon which the pressure sensitive adhesive is disposed, can optionally include a first primer layer. The first primer layer, when present, enhances bonding of the pressure sensitive adhesive to the first major surface of the substrate. Suitable first primer layers include chlorinated polyolefins, polyamides, modified acrylic polymers, and modified polymers, such as those disclosed in U.S. Pat. No. 5,677,376 (Groves), WO 199815601 (Groves), and WO 1999003907 (Groves). The first primer layer can also be a plasma primer layer, whereby a plasma, such as oxygen or nitrogen, is applied to the surface in order to change the surface chemistry by either oxidizing or reducing the surface.

The second major surface of the substrate, upon which the release layer is disposed, can optionally include a second primer layer. The second primer layer, when present, enhances bonding of the release layer to the second major surface. Suitable second primer layers include chlorinated polyolefins, polyamides, modified acrylic polymers, and modified polymers, such as those disclosed in U.S. Pat. No. 5,677,376 (Groves), WO 199815601 (Groves), and WO 1999003907 (Groves). The second primer layer can also be a plasma primer layer, whereby a plasma, such as oxygen or nitrogen, is applied to the surface in order to change the surface chemistry by either oxidizing or reducing the surface.

In many instances, the second primer layer is not necessary. This is because the segmented block copolymer of Formula I can, in many cases, laminate to a variety of substrates including cellulosic substrates and PET, without the need for an intervening second primer layer.

When used, the first primer layer, second primer layer, or both, can be affixed to the substrate material by any suitable method. Solvent coating is common. Typically, the content of the first or second primer layer is dispersed into a solvent at an appropriate concentration, which is often no greater than 5% solids. The solvent is then coated onto the substrate material followed by drying at ambient temperature or elevated temperature to produce a thin film of first primer layer, second primer layer, or both. Any solvent suitable for solvent coating can be used. Example solvents can include one or more of water, heptane, hexanes, toluene, acetone, ethyl acetate, isopropanol, and the like. Mixtures of more than one solvent can also be used. Another suitable method is exposure to plasma to form a plasma primer layer as discussed herein.

When the first primer layer, second primer layer, or both, is a plasma primer layer, the plasma primer layer can be created by treating the substrate with plasma, as discussed herein.

When the article is an adhesive article, one or more adhesives are typically disposed on the first major surface of the substrate. The one or more adhesives are most often one or more pressure sensitive adhesives.

Any suitable pressure sensitive adhesive can be used. Pressure sensitive adhesives are normally tacky at room temperature and can be adhered to a surface by application of light finger pressure. Thus, pressure sensitive adhesives can be distinguished from other types of adhesives that are not pressure sensitive. A general description of pressure sensitive adhesives can be found in the Encyclopedia of Polymer Science and Engineering, Vol. 13, Wiley-Interscience Publishers (New York, 1988). Additional description of pressure sensitive adhesives can be found in the Encyclopedia of Polymer Science and Technology, Vol. 1, Interscience Publishers (New York, 1964). Any suitable composition, material or ingredient can be used in the one or more pressure sensitive adhesives. Some suitable pressure sensitive adhesive compositions are disclosed in US 2003/0215628 (Ma). Typically, pressure sensitive adhesives include one or more elastomeric polymers, optionally in combination with one or more tackifying resins.

Elastomeric polymers that are useful in the one or more pressure sensitive adhesives include one or more (meth)acrylic polymers, natural or synthetic rubbers, block copolymers (typically of (meth)acrylates), silicones, and the like. Suitable materials include, without limitation, polyvinyl ethers, polyisoprenes, butyl rubbers, polyisobutylenes, polychloroprenes, butadiene-acrylonitrile polymers, styrene-isoprene, styrene-butylene, and styrene-isoprene-styrene block copolymers, ethylene-propylene-diene polymers, styrene-butadiene polymers, styrene polymers, poly-alpha-olefins, amorphous polyolefins, polysiloxanes, ethylene vinyl acetates, polyurethanes, silicone-urea polymers, silicone-urethane polymers, polyvinylpyrrolidones, and any combination thereof. Examples of suitable (meth)acrylic polymers include polymers made from the polymerization of one or more (meth)acrylates. Commonly used (meth)acrylates include methyl methacrylate, ethyl methacrylate, n-butyl methacrylate, methyl acrylate, ethyl acrylate, n-butyl acrylate, iso-octyl acrylate, iso-nonyl acrylate, 2-ethyl-hexyl acrylate, decyl acrylate, dodecyl acrylate, n-butyl acrylate, hexyl acrylate, octadecyl acrylate, octadecyl methacrylate, acrylic acid, methacrylic acid, acrylonitrile, and combinations thereof. Examples of suitable commercially available block copolymers include those available under the trade designation KRATON from Kraton Polymers, Houston, Tex. Any of these or other suitable materials may be used in any combination, depending on the performance requirements of the final material.

One or more tackifiers can be used as components of the one or more pressure sensitive adhesives. Suitable tackifiers include wood rosins, hydrogenated rosins, tall oil rosins, terpene resins, phenolic resins, polyaromatics, petroleum-based resins, such as aliphatic C5 olefin-derived resins, and the like. Those of ordinary skill in the art recognize that a variety of tackifiers are available, and the specific choice of whether to use one or more tackifiers, and which one or more tackifiers to use, will depend on the performance requirements of the final product. The one or more tackifiers are not required and are not used in all cases. For example, some pressure sensitive adhesives, such as those which include elastomers that are self-tacky, are often used without added tackifier.

The one or more pressure sensitive adhesives can also contain additives such as plasticizers, fillers, antioxidants, stabilizers, pigments, and the like. Such additives are well known the person of ordinary skill in the art, and are disclosed, for example, in U.S. Pat. No. 6,632,522 (Hyde).

A variety of suitable substrates with suitable pressure sensitive adhesives disposed on a first major surface thereof are available commercially. Examples are available under the trade designations SCOTCH HIGH PERFORMANCE BOX SEALING TAPE 373, 3M 850 CLEAR POLYESTER FILM TAPE, SCOTCH BLUE PLATINUM PAINTER'S TAPE 2098, all of which are available from 3M Company, St. Paul, Minn., USA.

Articles as described herein can be in many different forms, but often include a tape. When the article includes a tape, the article can further comprise a roller such that the tape is wound around the roller. In this configuration, the pressure sensitive adhesive is typically in contact with the release layer in order to facilitate easy unwinding of the wound tape.

Depending on the desired application, tapes can be hand-tearable such that they can easily be torn off a roll of tape by hand without the need for scissors, a knife, or another cutting device. Other tapes are not hand-tearable. When such tapes are used, it is often convenient to include a cutting element in the article. The cutting element can facilitate cutting the tape off the roll and into smaller pieces. Rollers and cutting elements for use with tapes are known in the art, and can be selected by a person of ordinary skill depending on the dimensions of the tape, the desired application, and other factors known in the art. A dispenser for the tape can also be included as part of the article. Any type of dispenser can be used, depending on the application. The dispenser can include one or more of a roller, cutting edge, dust cover, and the like.

The Figures depict particular arrangements of articles described herein. FIG. 1 shows article 1000 comprising substrate 1100. Substrate 1100, which can be any substrate, for example those described herein, comprises first major surface 1110 and second major surface 1120.

Pressure sensitive adhesive 1200 is disposed on first major surface 1100. Pressure sensitive adhesive 1200 can be any pressure sensitive adhesive, for example those described herein.

Release layer 1300 is disposed on second major surface 1120. Release layer 1300 can be any release layer, for example those described herein, and can contain a segmented block copolymer of Formula I.

Figure 2:
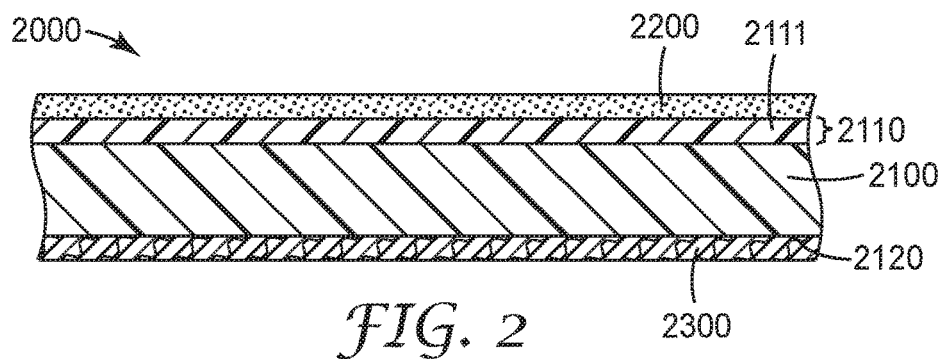
FIG. 2 is a profile view of another article as described herein.

FIG. 2 shows article 2000, which includes substrate 2100, which can be any substrate, for example those described herein, having first major surface 2110 and second major surface 2120. First major surface 2110 includes primer layer 2111, which can be any primer layer, for example those described herein. In FIG. 2, there is no primer layer on second major surface 2120.

Pressure sensitive adhesive 2200 is disposed on first major surface 2110 so as to contact primer layer 2111. Pressure sensitive adhesive 2200 can be any pressure sensitive adhesive, such as those described herein.

Release layer 2300 is disposed on second major surface 2120. Release layer 2300 can be any release layer, such as those described herein, and can contain a segmented block copolymer of Formula I.

Figure 3:
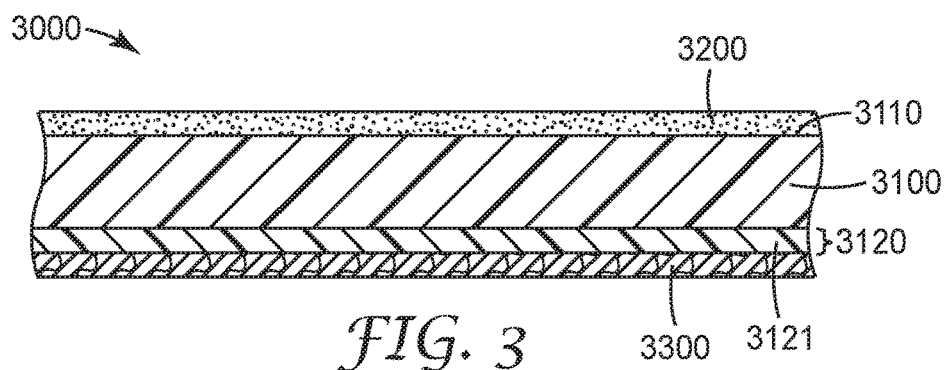
FIG. 3 is a profile view of still another article as described herein.

FIG. 3 shows article 3000, which includes substrate 3100, which can be any substrate, for example those described herein, having first major surface 3110 and second major surface 3120. Second major surface 3120 includes primer layer 3121, which can be any primer layer, for example those described herein. In FIG. 3, there is no primer layer on first major surface 3110.

Pressure sensitive adhesive 3200 is disposed on first major surface 3110. Pressure sensitive adhesive 3200 can be any pressure sensitive adhesive, such as those described herein.

Release layer 3300 is disposed on second major surface 3120 so as to contact primer layer 3121. Release layer 3300 can be any release layer, such as those described herein, and can contain a segmented block copolymer of Formula I.

Figure 4:
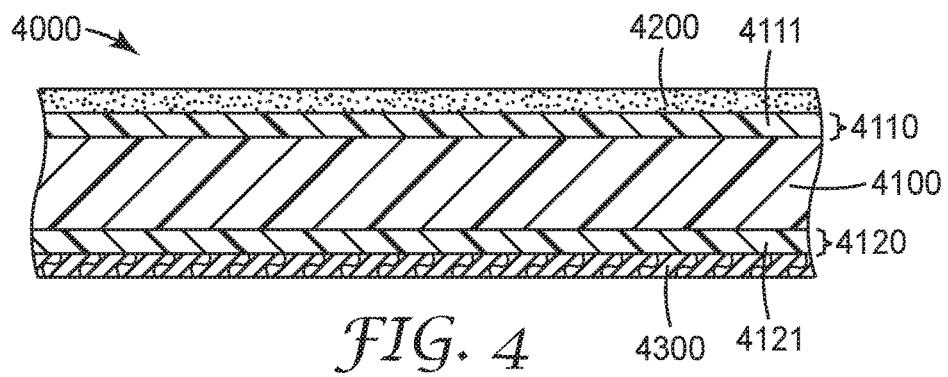
FIG. 4 is a profile view of yet another article as described herein.

FIG. 4 shows article 4000, which includes substrate 4100, which can be any substrate, for example those described herein, having first major surface 4110 and second major surface 4120. First major surface 4110 includes first primer layer 4111, and second major surface 4120 includes second primer layer 4121.

Pressure sensitive adhesive 4200 is disposed on first major surface 4110 so as to contact first primer layer 4111. Pressure sensitive adhesive 4200 can be any pressure sensitive adhesive, such as those described herein.

Release layer 4300 is disposed on second major surface 4120 so as to contact second primer layer 4121. Release layer 4300 can be any release layer, such as those described herein, and can contain a segmented block copolymer of Formula I.

Figure 5:
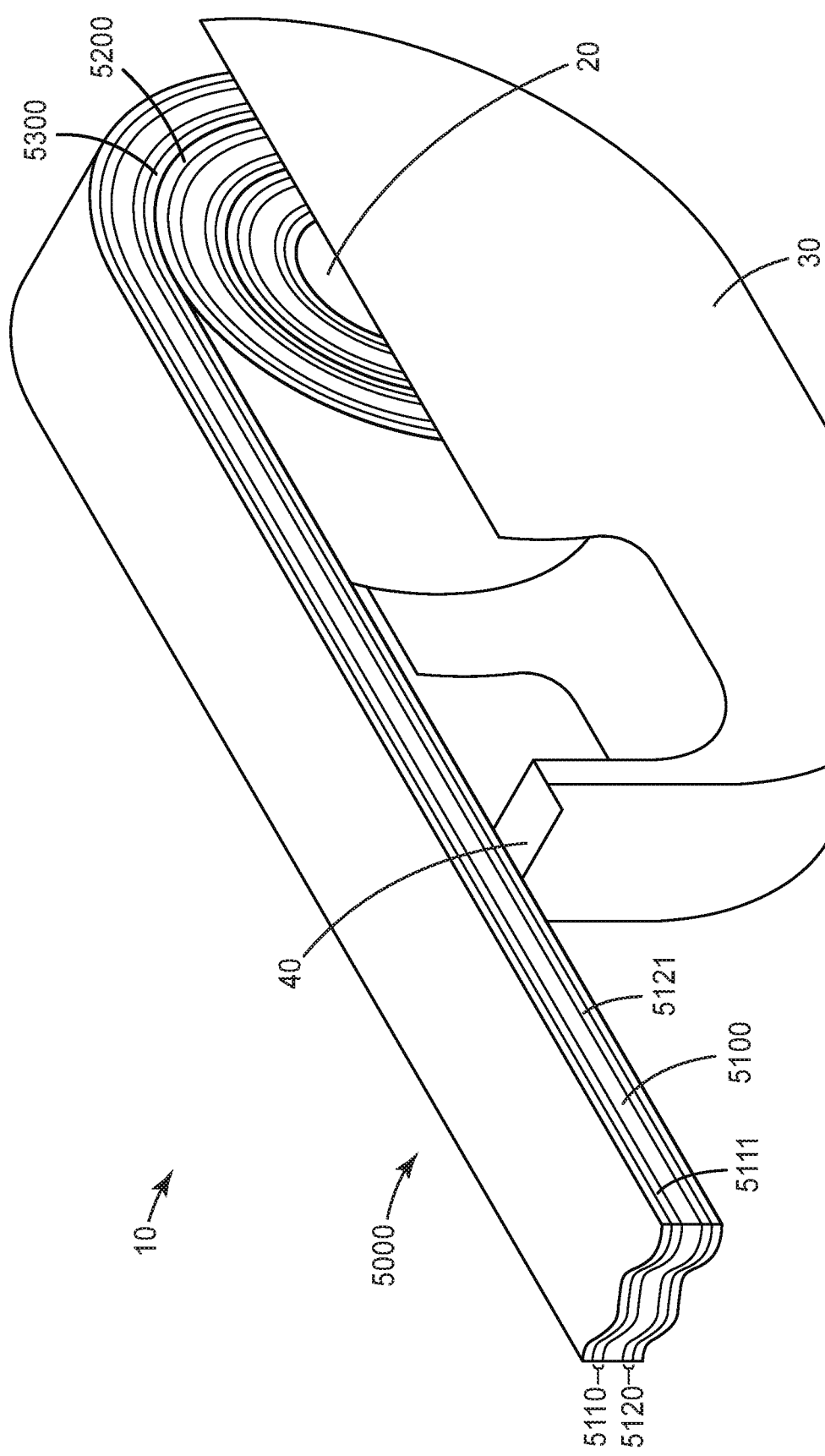
FIG. 5 is a view of an article as described herein in the form of a wound tape with a roller and cutting element.

FIG. 5 depicts an article 10 comprising tape 5000. Tape 5000 comprises substrate 5100, which can be any substrate, for example those described herein, having first major surface 5110 and second major surface 5120. First major surface 5110 includes first primer layer 5111, which can be any primer layer such as those discussed herein. Second major surface 5120 includes second primer layer 5121, which can be any primer layer such as those discussed herein.

Pressure sensitive adhesive 5200 is disposed on first major surface 5110 so as to contact first primer layer 5111. Pressure sensitive adhesive 5200 can be any pressure sensitive adhesive, such as those described herein.

Release layer 5300 is disposed on second major surface 5210 so as to contact second primer layer 5211. Release layer 5300 can be any release layer, such as those described herein, and can contain a segmented block copolymer of Formula I.

The article 10 also includes roller 20 and dispenser 30. Tape 5000 is wound around roller 20 such that pressure sensitive adhesive 5200 releasably contacts release layer 5300. In this configuration, a user can easily unwind and use tape 5000. Article 10 also includes cutting element 40 to facilitate cutting tape 5000 into desired lengths. In FIG. 5, cutting element 40 is attached to roller 20, but this is not required since other configurations of these elements are known to people of ordinary skill in the tape art.

In addition to finding use in a release layer of a tape, the segmented block copolymers described herein can find use in a release liner. A release liner is an article with a first major surface and a second major surface, wherein the first major surface is an adhesive-facing surface. The adhesive-facing surface is designed to be placed on an adhesive, such as a pressure sensitive adhesive. Thus, the release liner can keep the adhesive clean and free of debris before use. The adhesive-facing surface comprises a release layer that is designed to abut an adhesive. In use, the release liner is removed before the adhesive, such as the pressure sensitive, is applied to one or more adherents.

While the Figures, as well as a portion of the description, are directed to tapes, the articles as disclosed herein are not limited to tapes. Instead, tapes are merely one exemplary article that can be coated with a segmented block copolymer of Formula I. A variety of articles can include the segmented block copolymer of Formula I as a component, or can be coated by the segmented block copolymer of Formula I.

LIST OF ILLUSTRATIVE EMBODIMENTS

The following is a list of embodiments that illustrate particular aspects of the disclosure. This list is not intended to be comprehensive because other embodiments are also possible. The list is also not intended to be limiting.

Embodiment 1

A segmented polyamide silicone block copolymer of Formula I

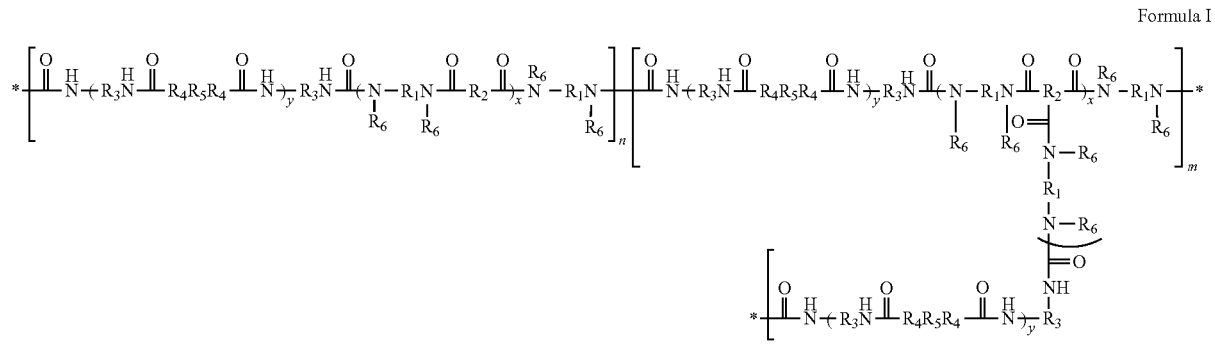

Formula I wherein
each * represents a point of attachment at the end of a repeat unit;
each $R_1$ is independently selected from alkylene, alkenylene, arylene, substituted arylene, heteroarylene, or substituted heteroarylene;
each $R_2$ is independently selected from dimer acid residue, alkene, alkylene, arylene, and heteroarylene, with the proviso that at least one $R_2$ is dimer acid residue;
each $R_3$ is independently selected from alkylene, arylene, and substituted arylene;
each $R_4$ is independently selected from O and N—$R_6$;
each $R_5$ is independently selected from one or more silicone polymers and one or more silicone polyethers, with the proviso that the one or more silicone polymers constitute no less than 60% by weight of the weight of all $R_5$ moieties;
each $R_6$ is independently selected from H and alkyl;
each y is the independently from 1 to 1000;
each x is independently from 2 to 200;
n+m is from 2 to 1000; and
m is no more than n/10.

Embodiment 1a

The segmented polyamide silicone block copolymer of embodiment 1, wherein m is m is no more than (m+n)/20, no more than (m+n)/30, no more than (m+n)/50, or no more than (n+m)/100.

Embodiment 1b

The segmented polyamide silicone block copolymer of any of the preceding embodiments, wherein the silicone polymers constitute no less than 65%, no less than 75%, no less than 80%, no less than 90%, or no less than 95% by weight of all $R_5$ moieties.

Embodiment 2

A segmented polyamide silicone block copolymer any of the preceding embodiments, wherein at least 50% by weight of $R_2$, based on the total weight or all $R_2$ groups, is dimer acid.

Embodiment 3

A segmented polyamide silicone block copolymer of any of the preceding embodiments, wherein at least 55% by weight of $R_2$, based on the total weight or all $R_2$ groups, is dimer acid residue.

Embodiment 4

A segmented polyamide silicone block copolymer of any of the preceding embodiments, wherein at least 60% by weight of $R_2$, based on the total weight or all $R_2$ groups, is dimer acid residue.

Embodiment 5

A segmented polyamide silicone block copolymer of any of the preceding embodiments, wherein at least 65% by weight of $R_2$, based on the total weight or all $R_2$ groups, is dimer acid residue.

Embodiment 6

A segmented polyamide silicone block copolymer of any of the preceding embodiments, wherein at least 70% by weight of $R_2$, based on the total weight or all $R_2$ groups, is dimer acid residue.

Embodiment 7

A segmented polyamide silicone block copolymer of any of the preceding embodiments, wherein at least 75% by weight of $R_2$, based on the total weight or all $R_2$ groups, is dimer acid residue.

Embodiment 8

A segmented polyamide silicone block copolymer of any of the preceding embodiments, wherein at least 80% by weight of $R_2$, based on the total weight or all $R_2$ groups, is dimer acid residue.

Embodiment 9

A segmented polyamide silicone block copolymer of any of the preceding embodiments, wherein at least 90% by weight of $R_2$, based on the total weight or all $R_2$ groups, is dimer acid residue.

Embodiment 10

A segmented polyamide silicone block copolymer of any of the preceding embodiments, wherein at least 95% by weight of $R_2$, based on the total weight or all $R_2$ groups, is dimer acid residue.

Embodiment 11

A segmented polyamide silicone block copolymer of any of the preceding embodiments, wherein each $R_2$ is a dimer acid residue.

Embodiment 12

A segmented polyamide silicone block copolymer of any of embodiments 1-10, wherein at least one $R_2$ is selected from the group consisting of alkene, alkylene, arylene, substituted arylene, heteroarylene, and substituted heteroarylene.

Embodiment 13

A segmented polyamide silicone block copolymer of embodiment 12, wherein at least one $R_2$ is alkylene.

Embodiment 14

A segmented polyamide silicone block copolymer of embodiment 13, wherein the alkylene is $C_1$ to $C_{22}$ alkylene.

Embodiment 15

A segmented polyamide silicone block copolymer of any of embodiments 1-10 or 12-14, wherein at a least one $R_2$ is alkylene.

Embodiment 16

A segmented polyamide silicone block copolymer of embodiment 15, wherein the alkylene is $C_2$ to $C_{22}$ alkylene.

Embodiment 17

A segmented polyamide silicone block copolymer of any of embodiments 1-10 or 12-16, wherein at a least one $R_2$ is arylene or substituted arylene.

Embodiment 18

A segmented polyamide silicone block copolymer of embodiment 17, wherein the arylene or substituted arylene is phenylene or substituted phenylene.

Embodiment 19

A segmented polyamide silicone block copolymer of any of embodiments 1-10 or 12-18, wherein at a least one $R_2$ is heteroarylene or substituted heteroarylene.

Embodiment 20

A segmented polyamide silicone block copolymer of any the preceding embodiments, wherein at least one $R_3$ is selected from the group consisting of alkylene, arylene, substituted arylene, heteroarylene, and substituted heteroarylene.

Embodiment 21

A segmented block segmented polyamide silicone block copolymer of any the preceding embodiments, wherein at least one $R_3$ alkylene.

Embodiment 22

A segmented silicone polyamide block copolymer of any of the preceding embodiments, wherein at least one $R_4$ is O.

Embodiment 23

A segmented silicone polyamide block copolymer of any of the preceding embodiments, wherein each $R_4$ is O.

Embodiment 24

A segmented silicone polyamide block copolymer of any of the preceding embodiments, wherein at least one $R_4$ is N—$R_6$.

Embodiment 25

A segmented silicone polyamide block copolymer of any of the preceding embodiments, wherein each R4 is N—R6

Embodiment 26

A segmented block copolymer of any of the preceding embodiments, wherein each $R_5$ is independently selected from one or more silicone polymers.

Embodiment 27

The segmented block copolymer of embodiment 26, wherein the one or more silicone polymers are independently selected from poly(diorgano siloxanes).

Embodiment 28

The segmented block copolymer of embodiment 27, wherein the organic radicals of the poly(diorgano siloxanes) are independently selected from alkyl, aryl, and substituted aryl.

Embodiment 29

The segmented block copolymer of embodiment 28, wherein the organic radicals of the poly(diorgano siloxanes) are independently selected from alkyl and aryl.

Embodiment 30

The segmented block copolymer of embodiment 29, wherein the organic radicals of the poly(diorgano siloxanes) are alkyl.

Embodiment 31

The segmented block copolymer of embodiment 30, wherein the alkyl is $C_1$ to $C_{22}$ alkyl.

Embodiment 32

The segmented block copolymer of embodiment 27, wherein the poly(diorgano siloxane) is PDMS.

Embodiment 33

The segmented block copolymer of any of the preceding embodiments, wherein the silicone polymer has a number average molecular weight no less than 1 kD.

Embodiment 34

The segmented block copolymer of any of the preceding embodiments, wherein the silicone polymer has a number average molecular weight no less than 2.5 kD.

Embodiment 35

The segmented block copolymer of any of the preceding embodiments, wherein the silicone polymer has a number average molecular weight no less than 5 kD.

Embodiment 36

The segmented block copolymer of any of the preceding embodiments, wherein the silicone polymer has a number average molecular weight no less than 7.5 kD.

Embodiment 37

The segmented block copolymer of any of the preceding embodiments, wherein the silicone polymer has a number average molecular weight no less than 10 kD.

Embodiment 38

The segmented block copolymer of any of the preceding embodiments, wherein the silicone polymer has a number average molecular weight no less than 12.5 kD.

Embodiment 39

The segmented block copolymer of any of the preceding embodiments, wherein the silicone polymer has a number average molecular weight no less than 15 kD.

Embodiment 40

The segmented block copolymer of any of the preceding embodiments, wherein the silicone polymer has a number average molecular weight no less than 20 kD.

Embodiment 41

The segmented block copolymer of any of the preceding embodiments, wherein the silicone polymer has a number average molecular weight no less than 25 kD.

Embodiment 42

The segmented block copolymer of any of the preceding embodiments, wherein the silicone polymer has a number average molecular weight no less than 30 kD.

Embodiment 43

The segmented block copolymer of any of the preceding embodiments, wherein the silicone polymer has a number average molecular weight no less than 40 kD.

Embodiment 44

The segmented block copolymer of any of the preceding embodiments, wherein the silicone polymer has a number average molecular weight no less than 50 kD.

Embodiment 45

The segmented block copolymer of any of the preceding embodiments, wherein the silicone polymer has a number average molecular weight no greater than 100 kD.

Embodiment 46

The segmented block copolymer of any of the preceding embodiments, wherein the silicone polymer has a number average molecular weight no greater than 75 kD.

Embodiment 47

The segmented block copolymer of any of the preceding embodiments, wherein the silicone polymer has a number average molecular weight no greater than 60 kD.

Embodiment 48

The segmented block copolymer of any of the preceding embodiments, wherein the silicone polymer has a number average molecular weight no greater than 50 kD.

Embodiment 49

The segmented block copolymer of any of the preceding embodiments, wherein the silicone polymer has a number average molecular weight no greater than 40 kD.

Embodiment 50

The segmented block copolymer of any of the preceding embodiments, wherein the silicone polymer has a number average molecular weight no greater than 30 kD.

Embodiment 51

The segmented block copolymer of any of the preceding embodiments, wherein the silicone polymer has a number average molecular weight no greater than 25 kD.

Embodiment 52

The segmented block copolymer of any of the preceding embodiments, wherein the silicone polymer has a number average molecular weight no greater than 20 kD.

Embodiment 53

The segmented block copolymer of any of the preceding embodiments, wherein the silicone polymer has a number average molecular weight no greater than 15 kD.

Embodiment 54

The segmented block copolymer of any of the preceding embodiments, wherein the silicone polymer has a number average molecular weight no greater than 12.5 kD.

Embodiment 55

The segmented block copolymer of any of the preceding embodiments, wherein the silicone polymer has a number average molecular weight no greater than 10 kD.

Embodiment 56

The segmented block copolymer of any of the preceding embodiments, wherein the silicone polymer has a number average molecular weight no greater than 7.5 kD.

Embodiment 57

The segmented block copolymer of any of the preceding embodiments, wherein $R_6$ is selected from H and alkyl.

Embodiment 58

The segmented block copolymer of embodiment 57, wherein at least one $R_6$ is H.

Embodiment 59

The segmented block copolymer of any of embodiments 57-58, wherein at least one $R_6$ is alkyl.

Embodiment 60

The segmented block copolymer of embodiment 59, wherein the alkyl is $C_1$ to $C_{12}$ alkyl.

Embodiment 61

The segmented block copolymer of embodiment 60, wherein the alkyl is methyl.

Embodiment 62

The segmented block copolymer of embodiment 58, wherein each $R_6$ is H.

Embodiment 63

The segmented block copolymer of any of embodiments 57 or 60-62, wherein each $R_6$ is alkyl.

Embodiment 64

The segmented block copolymer of any of the preceding embodiments, wherein x is 2-50.

Embodiment 65

The segmented block copolymer of any of the preceding embodiments, wherein x is 10-30.

Embodiment 66

The segmented block copolymer of any of the preceding embodiments, wherein y is 1-1000.

Embodiment 67

The segmented block copolymer of any of the preceding embodiments, wherein y is 2-500.

Embodiment 68

The segmented block copolymer of any of the preceding embodiments, wherein n is 2-500

Embodiment 69

The segmented block copolymer of any of the preceding embodiments, wherein n is 100-200.

Embodiment 70

An article comprising a substrate having at least a first major surface and a release layer comprising a segmented block copolymer of any of the preceding embodiments on the first major surface.

Embodiment 71

The article of embodiment 70, wherein the substrate is a tape backing.

Embodiment 72

The article of any of embodiments 70-71, wherein the substrate comprises at least one cellulosic material.

Embodiment 73

The article of any of embodiments 70-71, wherein the substrate comprises at least one non-cellulosic material.

Embodiment 74

The article of any of embodiments 70-73, wherein the article further comprises a second major surface and an adhesive disposed on the second major surface.

Embodiment 75

The article of embodiment 74, wherein the adhesive is a pressure sensitive adhesive.

Embodiment 76

The article of embodiment 75, wherein the pressure sensitive adhesive comprises at least one of (meth)acrylic polymers, natural rubbers, synthetic rubbers, and silicone elastomers.

Embodiment 77

The article of embodiment 75 or 76, wherein the pressure sensitive adhesive comprises a tackifier.

Embodiment 78

The article of any of embodiments 70-77, wherein the article is a repositionable article.

Embodiment 79

The article of any of embodiments 74-78, wherein the pressure sensitive adhesive is a repositionable adhesive.

Embodiment 80

The article of any of embodiments 70 or 72-77, wherein the article is a release liner.

EXAMPLES

All materials are commercially available, for example from Sigma-Aldrich Chemical Company, Milwaukee, Wis., USA, or known to those skilled in the art, unless otherwise stated or apparent.

The following abbreviations are used in this section: FTIR=Fourier transform infrared, mL=milliliters, g=grams, kg=kilograms, lb=pounds, cm=centimeters, mm=millimeters, μm=micrometers, mil=thousandths of an inch, wt %=weight percent, min=minutes, h=hours, d=days, NMR=nuclear magnetic resonance, ppm=parts per million, eq=equivalent. Abbreviations for materials used in this section, as well as descriptions of the materials, are provided in Table 2.

Materials

TABLE 2

| Material | Details |
| --- | --- |
| Dimethyl adipate | Available from Sigma Aldrich, St. Louis, MO, USA |
| Hexamethylene diamine | Available from Alfa Aesar, Ward Hill, MA, USA |
| DesW | A monomeric cycloaliphatic diisocyante, available under the trade designation "DESMODUR W" from Covestro A.G., Leverkusen, Germany |
| DFA | Dimerized fatty acid, available under the trade designation "Pripol 1013" from Croda, Inc., East Yorkshire, UK |
| HDFA | Hydrogenated dimerized fatty acid, available under the trade designation "Pripol 1009" from Croda, Inc. |
| EDA | Ethylene diamine, available from Sigma Aldrich |

TABLE 2-continued

| Material | Details |
| --- | --- |
| PDMS-NH2 5K | A polydimethylsiloxane diamine of the following formula |

$$H_2N-\!\!\!\!\diagup\!\!\!\!\diagdown\!\!\!\!-Si(CH_3)_2-O-[Si(CH_3)_2-O]_n-Si(CH_3)_2-\!\!\!\!\diagup\!\!\!\!\diagdown\!\!\!\!-NH_2$$

| Material | Details |
| --- | --- |
| | Polydimethylsiloxane diamine with a number average molecular weight of about 5,000 g/mole can be prepared according to the procedure described in Example 2 of U.S. Pat. No. 5,214,119 |
| PE-NH2 | Polyether diamine, available under the trade designation "Jeffamine ED-900" from Huntsman Corp., Salt Lake City, UT, USA |
| XDATFEE | m-Xylyl-bis-oxamic acid trifluoroethyl ester, which can be prepared according to the procedure described in Example 4 of U.S. Pat. No. 8,765,881 |
| NMP | N-Methyl pyrrolidone, available from Sigma Aldrich |
| DMF | N,N-dimethylformamide, available from VWR, Radnor, PA, USA |
| Ethyl acetate | Available from VWR |
| Sec-butanol | Available from VWR |
| Toluene | Available from VWR |
| IPA | Isopropyl alcohol, available from VWR |
| PET | Mitsubishi 3SAB PET available from Mitsubishi Polyester Film, Inc., Greer, SC, USA |

Characterization Methods
Testing for NCO

Testing for NCO by FTIR spectrophotometry was performed on a FTIR spectrophotometer available under the trade designation "Avatar 370" from Thermo-Nicolet, Waltham, Mass. To evaluate the amount of free isocyanate, 1-2 drops of the reaction product were sampled from the reactor and placed on a FTIR grade NaCl crystal. The solvent was allowed to evaporate under ambient conditions. When the residue was deemed to be dry by visual inspection, the NaCl crystal was placed in the instrument and the FTIR spectrum was acquired. Typically, 8 scans were collected and the spectrum was presented in transmission units. The NCO peak intensity at 2270 cm$^{-1}$ was determined by comparison with the immediately surrounding baseline. When a smooth baseline with no trace of a NCO peak was observed, it was determined that the reaction had attained its endpoint.

Peel Force and Readhesion

A 5% solids polymer solution in 90:10 toluene:IPA (by weight) of each example tested for peel force was coated onto 508 μm (2 mil) PET using a #3 Meyer wire wound rod. The coated substrates were dried in a 65° C. oven for 15 min and conditioned for 1 h at 22° C. and 50% relative humidity (CT/CH). Strips (2.54 cm by 15.24 cm) of test tape (3M™ Polyester Film Tape 850, Scotch® Box Sealing Tape 373, or Scotch® Blue Platinum Painter's Tape 2098, all available from 3M Company, St. Paul, Minn., USA) were adhered to the above coated sheets using a 0.91 kg (2 lb) roller. The resulting composites were aged for 3 d at CT/CH and 7 d at 50° C. A 2.54 cm by 20.32 cm strip of each composite (in triplicate) was laminated to the stage of an Instrumentors, Inc. slip/peel tester (Model 3M90) with double coated tape. The peel force required to remove the test tape at a 180 degree angle and 228.6 cm/min peel rate was then measured and reported as peel force in units of N/10 mm. To measure readhesion, the freshly peeled test tape was re-adhered to a clean glass plate using a 0.91 kg (2 lb) roller. The force required to remove the tape at a 180 degree angle and 228.6 cm/min was then measured and reported as readhesion to glass in units of N/10 mm. The results of peel force and readhesion are provided in Table 3, below.

Preparative Example 1 (PE-1)

To a 1000 mL, 3 neck, round bottom flask fitted with overhead stirring, thermocouple, and a distillation head, was added 152.4 g dimethyl adipate and 203.4 g hexamethylene diamine. The reaction mixture was heated to 180° C. overnight with stirring under nitrogen. During this time, approximately 50 g of methanol by-product was collected in the receiver. The mixture was then cooled and collected as a waxy mass on cooling. This product was then dispersed into toluene at 30 wt % and stirred overnight. The toluene suspension was then filtered and the residue was further washed with copious amounts of toluene. The washed residue was air dried overnight and collected.

$M_w$ of the collected residue was calculated as $M_n \times 2$; $M_n$ was determined by integration of proton NMR peaks. A sample of PE-1 was dissolved to a concentration of approximately 1 wt % in a 83:17 mixture, by weight, of hexafluoroisopropanol, available from Alfa Aesar, and deuterated methanol, available from Cambridge Isotope Laboratories, Tewksbury, Mass., USA. The solution was boiled gently to facilitate fast dissolution. Proton NMR spectra were collected on a Bruker 300 Ultrashield NMR instrument, available from Bruker, Billerica, Mass., USA, and integrated using ACD/SpecManager NMR software, version 12.00, available from Advanced Chemistry Development, Inc., Toronto, Calif. The methylene protons on the carbon alpha to the amine end groups (2.85 ppm, 4 per molecule) were integrated against the signals from the other methylene carbons (1.34, 1.47, 1.57, 2.17, 3.15 ppm). Based on the integration and formula IV below, assuming that for every 4 protons on carbons alpha to amine end groups in the structure presented in Formula IV there are 8+(n*20) methylene protons not alpha to amine end groups, Mn of PE-1 was determined to be 260 g/eq and $M_w$ of PE-1 was determined to be 520±10 g/mol.

up with an ice bath for cooling was added 8.47 g of DesW and 128 g toluene. The mixture was cooled below 25° C. and 63.55 g of PDMS-NH2 5K was added, keeping the batch temperature below 25° C. This mixture was stirred for 2 h. To the mixture was added 15.9 g of PE-NH2, keeping the batch temperature below 25° C. and reacted for 2 h. A solution consisting of 71.0 g of amine terminated polyamide prepared as described in PE-1, 380 g of toluene, and 112 g Formula IV

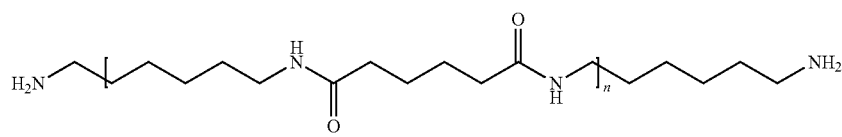

Example 1 (EX-1)

To a 1000 mL, 3 neck, round bottom flask fitted with overhead stirring, nitrogen inlet, and an addition funnel set up with an ice bath for cooling was added 159.2 g of PDMS-NH2 5K in 450 g of sec-butanol. The reactor contents were cooled to a batch temperature of 15° C. through the addition funnel 10.8 g of DesW was added over 25 min keeping the batch temperature below 15° C. This mixture was reacted for 2 h. Again the batch was cooled to 15° C. and a mixture of 50 g of amine terminated polyamide prepared as described in PE-1 and 25 g of sec-butanol was added over 15 minutes. The mixture was stirred overnight at ambient temperature. Analysis by FTIR spectrophotometry showed no NCO peak. Toluene was the added until a clear mixture was observed.

Example 2 (EX-2)

To a 1000 mL, 3 neck, round bottom flask fitted with overhead stirring, nitrogen inlet, and an addition funnel set up with an ice bath for cooling was added 40.5 g of PDMS-NH2 5K in 560 g of toluene. The reactor contents were cooled to a batch temperature of 10° C. Through an addition funnel, 7.2 g of DesW was added over several minutes, keeping the batch temperature less than 20° C. This mixture was reacted for 1 h and warmed to ambient temperature. When FTIR spectrophotometry showed no change in NCO, the batch was again cooled to 10° C. and 92.4 g of amine terminated polyamide prepared as described in PE-1 was added at a rate such that the temperature stayed below 20° C. IPA was added until the reaction mixture became clear. The reaction was stirred at ambient temperature until analysis by FTIR spectrophotometry showed no NCO peak.

Example 3 (EX-3)

To a 1000 mL, 3 neck, round bottom flask fitted with overhead stirring, nitrogen inlet, and an addition funnel set up with an ice bath for cooling was added 5.52 g of DesW and 243 g toluene. The mixture was cooled to less than 10° C. Through an addition funnel, 14.0 g of PDMS-NH2 5K was added over several min, keeping the batch temperature below 10° C. Then the mixture was warmed to ambient temperature and 8 g of IPA was added until a clear mixture was observed; the mixture was stirred overnight; analysis by FTIR spectrophotometry showed no NCO peak.

Example 4 (EX-4)

To a 1000 mL, 3 neck, round bottom flask fitted with overhead stirring, nitrogen inlet, and an addition funnel set of IPA was added to the mixture and mixed overnight at ambient temperature; analysis by FTIR spectrophotometry showed no NCO peak. IPA was added until a clear mixture was observed.

Example 5 (EX-5)

To a 1000 mL, 3 neck, round bottom flask fitted with overhead stirring, nitrogen inlet, and an addition funnel set up with an ice bath for cooling was added 4.6 g of DesW and 60.0 g of toluene. The mixture was cooled below 25° C. and 56.0 g of PDMS-NH2 5K was added. The mixture was then mixed for 2 h. A solution consisting of 79.4 g of amine terminated polyamide prepared as described in PE-1, 380 g of toluene, and 112 g of IPA was added and the mixture was stirred overnight at ambient temperature. Analysis by FTIR spectrophotometry showed no NCO peak. IPA was added until a clear mixture was observed.

Example 6 (EX-6)

To a 1000 mL, 3 neck, round bottom flask fitted with overhead stirring, nitrogen inlet, and an addition funnel set up with an ice bath for cooling was added 6.1 g of DesW and 280 g toluene which is cooled below 25° C. To this mixture as added 112 g of PDMS-NH2 5K and mixed for 1 h. 200 g of toluene was added and mixed for an additional 1 h. To this was added 21.9 g of amine terminated polyamide prepared as described in PE-1, 160 g toluene, and 112 g IPA. The mixture was then stirred overnight at ambient temperature. Analysis by FTIR spectrophotometry showed no NCO peak. IPA was added until a clear mixture was observed.

TABLE 3

Peel force and readhesion results

|  |  | Peel Force (N/10 mm) | | Readhesion (N/10 mm) | |
| --- | --- | --- | --- | --- | --- |
| Example | Tape | 3 days CT/CH | 7 days 50° C. | 3 days CT/CH | 7 days 50° C. |
| EX-4 | 850 | 0.1 | 0.3 | 4.0 | 4.3 |
| EX-5 | 850 | 0.1 | 0.1 | 4.5 | 5.1 |
| EX-5 | 373 | 0.6 | 1.6 | 7.5 | 7.6 |
| EX-5 | 2098 | 0.9 | 1.6 | 2.6 | 2.1 |
| EX-6 | 850 | 0.0 | 0.1 | 4.5 | 5.3 |
| EX-6 | 373 | 0.1 | 0.2 | 7.5 | 7.7 |
| EX-6 | 2098 | 1.1 | 1.4 | 2.5 | 2.5 |

Various modifications and alterations of this disclosure may be made by those skilled in the art without departing from the scope and spirit of the disclosure, and it should be understood that this invention is not to be unduly limited to the illustrative embodiments set forth herein.

What is claimed is:

1. A segmented polyamide silicone block copolymer of Formula I

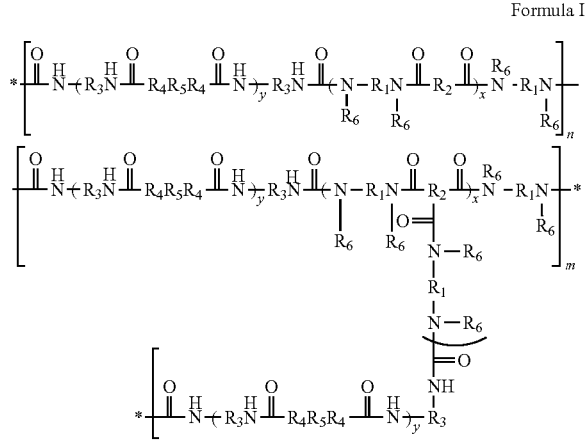

Formula I wherein
each * represents a point of attachment at the end of a repeat unit;
each $R_1$ is independently selected from alkylene, alkenylene, arylene, substituted arylene, heteroarylene, or substituted heteroarylene;
each $R_2$ is independently selected from dimer acid residue, alkene, alkylene, arylene, and heteroarylene, with the proviso that at least one $R_2$ is dimer acid residue;
each $R_3$ is independently selected from alkylene, arylene, and substituted arylene;
each $R_4$ is independently selected from O and N—$R_6$;
each $R_5$ is independently selected from one or more silicone polymers and one or more polyethers, with the proviso that the one or more silicone polymers constitute at least 60% by weight of all $R_5$ moieties;
each $R_6$ is independently selected from H and alkyl;
each y is the independently from 1 to 1000;
each x is independently from 2 to 200;
n+m is from 2 to 1000; and
m is no more than (m+n)/10.

2. A segmented polyamide silicone block copolymer of claim 1, wherein at least 50% by weight of $R_2$, based on the total weight or all $R_2$ groups, is dimer acid.

3. A segmented silicone polyamide block copolymer of claim 1, wherein at least one $R_4$ is O.

4. A segmented silicone polyamide block copolymer of claim 1, wherein each $R_4$ is O.

5. A segmented silicone polyamide block copolymer of claim 1, wherein at least one $R_4$ is N—$R_6$.

6. A segmented silicone polyamide block copolymer any of claim 1, wherein each $R_4$ is N—$R_6$.

7. The segmented block copolymer of claim 1, wherein the one or more silicone polymers are independently selected from poly(diorgano siloxanes).

8. The segmented block copolymer of claim 1, wherein the poly(diorgano siloxane) is PDMS.

9. The segmented block copolymer of claim 1, wherein the silicone polymer has a number average molecular weight no less than 1 kD.

10. The segmented block copolymer of claim 1, wherein the silicone polymer has a number average molecular weight of no greater than 100 kD.

11. An article comprising a substrate having at least a first major surface and a release layer comprising a segmented block copolymer of claim 1 on the first major surface.

12. The article of claim 11, wherein the article further comprises a second major surface and an adhesive disposed on the second major surface.

13. The article of claim 12, wherein the adhesive is a pressure sensitive adhesive.

14. The article of claim 11, wherein the article is a tape.

15. The article of claim 11, wherein the article is a release liner.

* * * * *

UNITED STATES PATENT AND TRADEMARK OFFICE
CERTIFICATE OF CORRECTION

PATENT NO. : 10,640,614 B2
APPLICATION NO. : 16/316795
DATED : May 5, 2020
INVENTOR(S) : Rajdeep Kalgutkar et al.

It is certified that error appears in the above-identified patent and that said Letters Patent is hereby corrected as shown below:

On the Title Page

Item (72) Under Inventors, delete "Rajeep S. Kalgutkar" and insert -- Rajdeep S. Kalgutkar --, therefor.

In the Specification

Column 3,
Line 48, delete "napthyl," and insert -- naphthyl, --, therefor.
Line 53, delete "toluyl," and insert -- tolyl, --, therefor.
Line 56, delete "napthylene," and insert -- naphthylene, --, therefor.

Column 4,
Line 57, delete "$\Sigma M_i N_i / M_i N_i$," and insert -- $\Sigma M_i^2 N_i / \Sigma M_i N_i$, --, therefor.

Column 7,
Line 3, delete "napthylene" and insert -- naphthylene --, therefor.
Line 4, delete "bensylene," and insert -- benzylene, --, therefor.
Line 6, delete "pyrrolidene" and insert -- pyrrolidine --, therefor.
Line 6, delete "piperdine" and insert -- piperidine --, therefor.
Line 7, delete "furane" and insert -- furan --, therefor.
Line 45, delete "napthylene" and insert -- naphthylene --, therefor.
Line 46, delete "bensylene," and insert -- benzylene, --, therefor.
Line 47, delete "furane" and insert -- furan --, therefor.
Lines 47 & 48, delete "pyrrolidene" and insert -- pyrrolidine --, therefor.
Line 48, delete "piperdine" and insert -- piperidine --, therefor.

Column 8,
Line 14, after "intervening" insert -- —N—$R_1$—N— --.

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,640,614 B2

Column 10,
Lines 20-28, delete "While it is most common to use one diamine and one diacid to make the amine terminated polyamide of Formula II, it is also possible to use more than one diamine and more than one diacid. Regardless of how many different diamines and diacids are used, the relative amount of diamine and diacid is typically chosen such that the quotient of number of moles of diamine and the number of moles of diacid is 0.7-1.3, such as 0.8-1.2, 0.9-1.1, or even 1." and insert the same on Column 10, Line 21, as a new paragraph.

Column 10,
Line 55, delete "diisocyantes," and insert -- diisocyanates, --, therefor.
Line 56, delete "diisocyantes," and insert -- diisocyanates, --, therefor.
Line 60, delete "dicycloexylmethane" and insert -- dicyclohexylmethane --, therefor.
Lines 65 & 66, delete "poly(organosilixane)," and insert -- poly(organosiloxane), --, therefor.

Column 11,
Line 3, delete "poly(organosilixane)" and insert -- poly(organosiloxane) --, therefor.
Line 15, delete "endgroups" and insert -- end groups --, therefor.

Column 19,
Line 2, after "copolymer" insert -- of --.

Column 21,
Line 21, delete "N—R6" and insert -- N—$R_6$. --, therefor.

Column 25,
Line 4, delete "2-500" and insert -- 2-500. --, therefor.

Column 25 & 26,
Line 49, delete "diisocyante," and insert -- diisocyanate, --, therefor.

In the Claims

Column 32,
Line 18, in Claim 6, after "copolymer" delete "any".